United States Patent
Oyanagi et al.

(10) Patent No.: US 9,034,427 B2
(45) Date of Patent: May 19, 2015

(54) METHOD OF FORMING OPAQUE LAYER, RECORDING PROCESS, INK SET, INK CARTRIDGE, AND RECORDING APPARATUS

(75) Inventors: Takashi Oyanagi, Matsumoto (JP); Chiyoshige Nakazawa, Suwa (JP); Kiyohiko Takemoto, Matsumoto (JP); Hiroki Nakane, Matsumoto (JP); Tsuyoshi Sano, Shiojiri (JP); Shuichi Koganehira, Matsumoto (JP)

(73) Assignee: Seiko Epson Corporation (JP)

( * ) Notice: Subject to any disclaimer, the term of this patent is extended or adjusted under 35 U.S.C. 154(b) by 1033 days.

(21) Appl. No.: 12/394,336

(22) Filed: Feb. 27, 2009

(65) Prior Publication Data

US 2009/0220695 A1    Sep. 3, 2009

(30) Foreign Application Priority Data

Feb. 29, 2008  (JP) ................... 2008-049155
Feb. 29, 2008  (JP) ................... 2008-049156
Apr. 11, 2008  (JP) ................... 2008-103262
Nov. 19, 2008  (JP) ................... 2008-295474

(51) Int. Cl.
   *B05D 5/00*   (2006.01)
   *B41J 2/21*   (2006.01)
   *C09D 11/322*  (2014.01)
   *C09D 11/40*  (2014.01)
   *C09D 11/54*  (2014.01)

(52) U.S. Cl.
   CPC ......... *B41J 2/2114* (2013.01); *C09D 11/322* (2013.01); *C09D 11/40* (2013.01); *C09D 11/54* (2013.01)

(58) Field of Classification Search
   CPC ...... C09D 11/40; C09D 11/54; C09D 11/322; B41J 2/2114
   USPC ............ 427/256; 428/207, 220, 315.5, 315.9, 428/317.9, 323; 106/31.6
   See application file for complete search history.

(56) References Cited

U.S. PATENT DOCUMENTS

| | | |
|---|---|---|
| 3,582,487 A | 6/1971 | Fuhr et al. |
| 3,607,693 A | 9/1971 | Fuhr et al. |
| 3,720,635 A | 3/1973 | Metzner et al. |
| 3,929,693 A | 12/1975 | Hochberg |
| 4,007,144 A | 2/1977 | Sanders et al. |
| 4,129,486 A | 12/1978 | Deutsch et al. |
| 4,133,793 A | 1/1979 | Lewis et al. |
| 4,190,602 A | 2/1980 | Brunisholz et al. |
| 4,233,195 A | 11/1980 | Mills |
| 4,239,866 A | 12/1980 | Reitel et al. |
| 4,239,966 A | 12/1980 | Wang |
| 4,308,400 A | 12/1981 | Felder et al. |
| 4,315,807 A | 2/1982 | Felder et al. |
| 4,318,791 A | 3/1982 | Felder et al. |
| 4,320,186 A | 3/1982 | Kato et al. |
| 4,321,118 A | 3/1982 | Felder et al. |
| 4,347,111 A | 8/1982 | Gehlhaus et al. |
| 4,370,379 A | 1/1983 | Kato et al. |
| 4,450,279 A | 5/1984 | Shirosaki et al. |
| 4,477,681 A | 10/1984 | Gehlhaus et al. |
| 4,507,466 A | 3/1985 | Tomalia et al. |
| 4,522,693 A | 6/1985 | Henne et al. |
| 4,558,120 A | 12/1985 | Tomalia et al. |
| 4,568,737 A | 2/1986 | Tomalia et al. |
| 4,587,329 A | 5/1986 | Tomalia et al. |
| 4,631,337 A | 12/1986 | Tomalia et al. |
| 4,694,064 A | 9/1987 | Tomalia et al. |
| 4,721,734 A | 1/1988 | Gehlhaus et al. |
| 4,830,902 A | 5/1989 | Plantenga et al. |
| 4,922,004 A | 5/1990 | Kohler et al. |
| 5,041,516 A | 8/1991 | Frechet et al. |
| 5,077,402 A | 12/1991 | Desobry et al. |
| 5,212,212 A | 5/1993 | Fonda |
| 5,221,334 A | 6/1993 | Ma et al. |
| 5,281,682 A | 1/1994 | Cornforth et al. |
| 5,453,121 A | 9/1995 | Nicholls et al. |
| 5,479,193 A | 12/1995 | Shimoda et al. |
| 5,504,512 A | 4/1996 | Shimoda et al. |
| 5,609,671 A | 3/1997 | Nagasawa |
| 5,623,001 A | 4/1997 | Figov |
| 5,662,736 A | 9/1997 | Sakai et al. |
| 5,662,738 A | 9/1997 | Schmid et al. |

(Continued)

FOREIGN PATENT DOCUMENTS

| | | |
|---|---|---|
| CN | 1060995 A | 5/1992 |
| CN | 1086637 C | 6/2002 |

(Continued)

OTHER PUBLICATIONS

English Abstract of Japanese Application 2005-068251 A Published Mar. 17, 2005.
English Abstract of Chinese Application 1086637C Published Jun. 26 2002.
English Abstract of Japanese Application 2004-009359A Published Jan. 15, 2004.
English Abstract of Japanese Application 137183A Published Jun. 1, 2006.
English Abstract of Japanese Application 2006-312711A Published Nov. 16, 2006.
Patent Abstracts of Japan of JP 11-11002 dated Jan. 19, 1999.
Patent Abstracts of Japan of JP 2002-38063 dated Feb. 6, 2002.
Patent Abstracts of Japan of JP 2002-249165 dated Sep. 3, 2002.
Patent Abstracts of Japan of JP 2002-292775 dated Oct. 9, 2002.

(Continued)

*Primary Examiner* — Xiao Zhao
(74) *Attorney, Agent, or Firm* — Harness, Dickey & Pierce, P.L.C.

(57) ABSTRACT

A method of forming an opaque layer includes forming a first layer by discharging droplets of an ink composition containing a metallic pigment on a record medium by an ink-jet recording process and forming a second layer by discharging droplets of an ink composition containing a white pigment on the record medium by an ink-jet recording process. The opaque layer is formed on the record medium on the side where the first layer and the second layer are formed in a region where the first layer and the second layer overlap each other.

10 Claims, No Drawings

(56) References Cited

U.S. PATENT DOCUMENTS

| | | |
|---|---|---|
| 5,690,723 A | 11/1997 | Sano et al. |
| 5,846,306 A | 12/1998 | Kubota et al. |
| 5,903,290 A | 5/1999 | Nicoloff, Jr. et al. |
| 5,928,419 A | 7/1999 | Uemura et al. |
| 5,952,401 A | 9/1999 | Kimura et al. |
| 5,958,121 A | 9/1999 | Lin |
| 5,976,233 A | 11/1999 | Osumi et al. |
| 6,030,441 A | 2/2000 | Kubota et al. |
| 6,087,416 A | 7/2000 | Pearlstine et al. |
| 6,114,404 A | 9/2000 | Deeken et al. |
| 6,117,606 A | 9/2000 | Macholdt et al. |
| 6,123,759 A | 9/2000 | Mise et al. |
| 6,136,286 A | 10/2000 | Okuyama et al. |
| 6,179,415 B1 | 1/2001 | Okazaki et al. |
| 6,187,897 B1 | 2/2001 | Kawashima et al. |
| 6,300,388 B1 | 10/2001 | Verdonck et al. |
| 6,322,188 B1 | 11/2001 | Sano |
| 6,331,111 B1 | 12/2001 | Cao |
| 6,332,291 B1 | 12/2001 | Flosbach et al. |
| 6,341,841 B1 | 1/2002 | Shimada et al. |
| 6,395,079 B1 | 5/2002 | Sano |
| 6,419,733 B1 | 7/2002 | Sano et al. |
| 6,428,662 B1 | 8/2002 | Woodruff et al. |
| 6,433,038 B1 | 8/2002 | Tanabe et al. |
| 6,444,019 B1 | 9/2002 | Zou et al. |
| 6,488,751 B1 | 12/2002 | Takemoto |
| 6,491,748 B2 | 12/2002 | Watanabe |
| 6,518,370 B2 | 2/2003 | Abuelyaman et al. |
| 6,558,460 B1 | 5/2003 | Walker et al. |
| 6,558,753 B1 | 5/2003 | Ylitalo et al. |
| 6,602,333 B2 | 8/2003 | Miyabayashi |
| 6,637,850 B2 | 10/2003 | Shimada et al. |
| 6,653,367 B2 | 11/2003 | Miyabayashi |
| 6,654,367 B1 | 11/2003 | Kaufman |
| 6,664,306 B2 | 12/2003 | Gaddam et al. |
| 6,726,756 B1 | 4/2004 | Zou et al. |
| 6,793,313 B1 | 9/2004 | Adachi et al. |
| 6,793,318 B2 | 9/2004 | Saksa |
| 6,846,074 B2 | 1/2005 | Hirai |
| 6,846,851 B2 | 1/2005 | Nakhmanovich et al. |
| 6,849,110 B2 | 2/2005 | Sano |
| 6,869,470 B2 | 3/2005 | Kato |
| 6,877,851 B2 | 4/2005 | Watanabe |
| 6,890,049 B2 | 5/2005 | Shimada et al. |
| 6,924,327 B2 | 8/2005 | Sano et al. |
| 7,008,475 B2 | 3/2006 | Randler et al. |
| 7,025,449 B2 | 4/2006 | Simons et al. |
| 7,040,747 B2 | 5/2006 | Kubota et al. |
| 7,064,153 B2 | 6/2006 | Bruck |
| 7,156,909 B2 | 1/2007 | Oyanagi et al. |
| 7,259,100 B2 | 8/2007 | Zurcher et al. |
| 7,285,592 B2 | 10/2007 | Harz et al. |
| 7,296,883 B2 | 11/2007 | Kanaya et al. |
| 7,303,619 B2 | 12/2007 | Oyanagi |
| 7,348,128 B2 | 3/2008 | Yamada |
| 7,384,472 B2 | 6/2008 | Schweikart et al. |
| 7,419,255 B2 | 9/2008 | Kawaguchi et al. |
| 7,438,405 B2 | 10/2008 | Ichizawa et al. |
| 7,513,945 B2 | 4/2009 | Nakano |
| 7,538,144 B2 | 5/2009 | Vanmaele et al. |
| 7,581,829 B2 | 9/2009 | Oyanagi et al. |
| 7,591,889 B2 | 9/2009 | Stoffel et al. |
| 7,604,693 B2 | 10/2009 | Oyanagi et al. |
| 7,619,015 B2 | 11/2009 | Oyanagi et al. |
| 7,670,418 B2 | 3/2010 | Kato et al. |
| 7,732,505 B2 | 6/2010 | Kito et al. |
| 7,753,514 B2 | 7/2010 | Nakano et al. |
| 7,790,245 B2 | 9/2010 | Oyanagi et al. |
| 7,828,888 B2 | 11/2010 | Itano et al. |
| 7,846,246 B2 | 12/2010 | Oyanagi et al. |
| 7,850,280 B2 | 12/2010 | Oyanagi et al. |
| 7,854,798 B2 | 12/2010 | Udagawa et al. |
| 7,855,041 B2 | 12/2010 | Weber et al. |
| 7,866,807 B2 | 1/2011 | Makuta et al. |
| 7,968,621 B2 | 6/2011 | Oyanagi et al. |
| 8,044,116 B2 | 10/2011 | Idemura et al. |
| 8,097,075 B2 | 1/2012 | Oyanagi et al. |
| 8,105,429 B2 | 1/2012 | Oyanagi et al. |
| 2003/0003296 A1* | 1/2003 | Dries et al. ............ 428/336 |
| 2003/0017353 A1* | 1/2003 | Yamaguchi et al. ......... 428/483 |
| 2003/0050379 A1 | 3/2003 | Shih et al. |
| 2003/0089271 A1* | 5/2003 | Hirano et al. ............ 106/31.9 |
| 2003/0144377 A1 | 7/2003 | Sano et al. |
| 2003/0153649 A1 | 8/2003 | Bromberg |
| 2003/0157356 A1* | 8/2003 | Tamura et al. ............ 428/542.2 |
| 2003/0176566 A1 | 9/2003 | Wight et al. |
| 2003/0203133 A1* | 10/2003 | Maekawa .................... 428/32.1 |
| 2003/0222959 A1 | 12/2003 | Yamanouchi et al. |
| 2003/0231234 A1 | 12/2003 | Ushirogouchi et al. |
| 2004/0021753 A1 | 2/2004 | Yoshihiro et al. |
| 2004/0069183 A1 | 4/2004 | Kamoto et al. |
| 2004/0257419 A1 | 12/2004 | Iinuma et al. |
| 2004/0266907 A1 | 12/2004 | Sugita et al. |
| 2005/0039631 A1 | 2/2005 | Best et al. |
| 2005/0133616 A1* | 6/2005 | Shimoda et al. ............ 239/135 |
| 2005/0158524 A1* | 7/2005 | Sloat et al. ................ 428/195.1 |
| 2005/0159501 A1 | 7/2005 | Kiefer-Liptak |
| 2005/0176841 A1 | 8/2005 | Krohn |
| 2005/0176847 A1 | 8/2005 | Cagle |
| 2005/0197418 A1 | 9/2005 | Graziano et al. |
| 2005/0197419 A1 | 9/2005 | Graziano et al. |
| 2005/0282930 A1 | 12/2005 | Fu et al. |
| 2006/0009546 A1* | 1/2006 | Brown ..................... 523/212 |
| 2006/0014849 A1 | 1/2006 | Vanmaele et al. |
| 2006/0014850 A1 | 1/2006 | Vanmaele et al. |
| 2006/0036001 A1 | 2/2006 | Oyanagi et al. |
| 2006/0078695 A1* | 4/2006 | Sen et al. ................ 428/32.34 |
| 2006/0092254 A1 | 5/2006 | Claes et al. |
| 2006/0158493 A1 | 7/2006 | Nakano et al. |
| 2006/0160917 A1 | 7/2006 | Oyanagi et al. |
| 2006/0187285 A1 | 8/2006 | Oyanagi et al. |
| 2006/0189712 A1 | 8/2006 | Kondo |
| 2006/0211788 A1 | 9/2006 | Krohn |
| 2006/0229382 A1 | 10/2006 | Schweikart et al. |
| 2006/0268084 A1 | 11/2006 | Nishizaki et al. |
| 2007/0022547 A1 | 2/2007 | O'Brien |
| 2007/0031615 A1* | 2/2007 | Nair et al. ............... 428/32.38 |
| 2007/0037961 A1 | 2/2007 | Oyanagi et al. |
| 2007/0044684 A1 | 3/2007 | Nakano et al. |
| 2007/0046720 A1 | 3/2007 | Konno et al. |
| 2007/0060670 A1 | 3/2007 | Ellis |
| 2007/0076069 A1 | 4/2007 | Edwards et al. |
| 2007/0120926 A1 | 5/2007 | Doumaux et al. |
| 2007/0129457 A1 | 6/2007 | Nakano et al. |
| 2007/0142501 A1 | 6/2007 | Oyanagi et al. |
| 2007/0148585 A1 | 6/2007 | Kaneko et al. |
| 2007/0222811 A1 | 9/2007 | Yanagi |
| 2007/0224345 A1 | 9/2007 | Metz et al. |
| 2007/0249750 A1 | 10/2007 | Oyanagi et al. |
| 2007/0281141 A1* | 12/2007 | Kohlweyer .................. 428/207 |
| 2008/0022893 A1 | 1/2008 | Mizutani |
| 2008/0024577 A1 | 1/2008 | Nakano et al. |
| 2008/0028980 A1 | 2/2008 | Aoki et al. |
| 2008/0081119 A1 | 4/2008 | Oyanagi et al. |
| 2008/0090931 A1 | 4/2008 | Nagvekar et al. |
| 2008/0096998 A1 | 4/2008 | Oyanagi et al. |
| 2008/0098928 A1 | 5/2008 | Oyanagi et al. |
| 2008/0125511 A1 | 5/2008 | Nakano et al. |
| 2008/0132599 A1 | 6/2008 | Nakano et al. |
| 2008/0145628 A1* | 6/2008 | Oyanagi et al. ............. 428/206 |
| 2008/0146689 A1 | 6/2008 | Oyanagi et al. |
| 2008/0152825 A1 | 6/2008 | Mukai et al. |
| 2008/0152828 A1 | 6/2008 | Mukai et al. |
| 2008/0152877 A1 | 6/2008 | Mukai et al. |
| 2008/0173214 A1 | 7/2008 | Oyanagi et al. |
| 2008/0182083 A1 | 7/2008 | Oyanagi et al. |
| 2008/0182085 A1 | 7/2008 | Oyanagi et al. |
| 2008/0207805 A1 | 8/2008 | Blease et al. |
| 2008/0213518 A1 | 9/2008 | Oyanagi et al. |
| 2008/0233362 A1 | 9/2008 | Kato et al. |
| 2008/0250970 A1 | 10/2008 | Oyanagi |
| 2008/0308004 A1 | 12/2008 | Deroover et al. |
| 2009/0053415 A1 | 2/2009 | Isobe |
| 2009/0075036 A1 | 3/2009 | Itano et al. |

(56) References Cited

U.S. PATENT DOCUMENTS

| | | |
|---|---|---|
| 2009/0099277 A1 | 4/2009 | Nagvekar et al. |
| 2009/0110827 A1 | 4/2009 | Nakano et al. |
| 2009/0142555 A1 | 6/2009 | Sano et al. |
| 2009/0169834 A1 | 7/2009 | Sano et al. |
| 2009/0208651 A1 | 8/2009 | Oyanagi et al. |
| 2009/0214833 A1 | 8/2009 | Oyanagi et al. |
| 2009/0233064 A1 | 9/2009 | Yatake et al. |
| 2009/0246479 A1 | 10/2009 | Mukai et al. |
| 2009/0280265 A1 | 11/2009 | Oyanagi et al. |
| 2009/0289973 A1 | 11/2009 | Makuta et al. |
| 2009/0295847 A1 | 12/2009 | Mukai et al. |
| 2010/0009136 A1 | 1/2010 | Oyanagi et al. |
| 2010/0086690 A1 | 4/2010 | Aoki |
| 2010/0086691 A1 | 4/2010 | Mukai et al. |
| 2010/0092674 A1 | 4/2010 | Mukai et al. |
| 2010/0092675 A1 | 4/2010 | Aoki |
| 2011/0014440 A1 | 1/2011 | Itano et al. |
| 2011/0036266 A1 | 2/2011 | Oyanagi et al. |
| 2011/0183124 A1 | 7/2011 | Aoki et al. |
| 2011/0183125 A1 | 7/2011 | Aoki et al. |
| 2011/0287236 A1 | 11/2011 | Nakano et al. |
| 2012/0006224 A1 | 1/2012 | Oyanagi et al. |

FOREIGN PATENT DOCUMENTS

| | | |
|---|---|---|
| CN | 1398724 A | 2/2003 |
| CN | 1721462 A | 1/2006 |
| CN | 1771307 A | 5/2006 |
| DE | 102005021160 | 11/2006 |
| EP | 0284561 A2 | 3/1988 |
| EP | 0333224 A2 | 9/1989 |
| EP | 0352821 A1 | 1/1990 |
| EP | 0 372 778 A1 | 6/1990 |
| EP | 0894835 A2 | 2/1999 |
| EP | 0997507 A1 | 5/2000 |
| EP | 1 045 013 A1 | 10/2000 |
| EP | 1260563 A1 | 11/2002 |
| EP | 1295916 A1 | 3/2003 |
| EP | 1 422 072 A1 | 5/2004 |
| EP | 1452569 A1 | 9/2004 |
| EP | 1616920 A1 | 1/2006 |
| EP | 1616921 A1 | 1/2006 |
| EP | 1862511 A | 3/2006 |
| EP | 1674499 A1 | 6/2006 |
| EP | 1614730 A1 | 11/2006 |
| EP | 1 752 504 B1 | 2/2007 |
| EP | 1 806 387 A1 | 7/2007 |
| EP | 1815978 A1 | 8/2007 |
| EP | 1 837 381 A1 | 9/2007 |
| EP | 1947151 A | 1/2008 |
| EP | 1950260 A | 1/2008 |
| EP | 1 942 157 A2 | 9/2008 |
| EP | 1 942 158 A2 | 9/2008 |
| GB | 1 276 369 | 7/1968 |
| GB | 1547283 A | 6/1976 |
| GB | 2029433 A | 3/1980 |
| GB | 2 172 655 A | 9/1986 |
| GB | 2 367 299 A | 4/2002 |
| JP | 47-23664 | 1/1972 |
| JP | 47-3981 | 2/1972 |
| JP | 47-6416 | 2/1972 |
| JP | 47-22326 | 6/1972 |
| JP | 56-028256 | 3/1981 |
| JP | 57-30704 | 2/1982 |
| JP | 59-42864 | 10/1984 |
| JP | 60-26403 | 6/1985 |
| JP | 60-26483 | 6/1985 |
| JP | 61-194062 | 8/1986 |
| JP | 62-001426 | 1/1987 |
| JP | 62-81345 | 4/1987 |
| JP | 63-61950 | 11/1988 |
| JP | 1-34242 | 7/1989 |
| JP | 01-238656 A | 9/1989 |
| JP | 2-9596 | 3/1990 |
| JP | 2-9597 | 3/1990 |
| JP | 02-211452 | 8/1990 |
| JP | 03-056573 | 3/1991 |
| JP | 03-79678 | 4/1991 |
| JP | 03-079678 A | 4/1991 |
| JP | 03-160068 A | 7/1991 |
| JP | 03-216379 A | 9/1991 |
| JP | 04-018462 A | 1/1992 |
| JP | 05-186725 A | 7/1993 |
| JP | 07-258578 | 10/1995 |
| JP | 08-003498 | 1/1996 |
| JP | 08-218018 A | 8/1996 |
| JP | 08-283596 | 10/1996 |
| JP | 08-295836 A | 11/1996 |
| JP | 10-110110 | 4/1998 |
| JP | 10-110111 | 4/1998 |
| JP | 10-110114 | 4/1998 |
| JP | 10-120956 A | 5/1998 |
| JP | 10-120958 | 5/1998 |
| JP | 10-195331 | 7/1998 |
| JP | 10-195360 | 7/1998 |
| JP | 10-237349 | 9/1998 |
| JP | 10-287035 A | 10/1998 |
| JP | 10-330665 | 12/1998 |
| JP | 11-11002 | 1/1999 |
| JP | 11-165420 | 6/1999 |
| JP | 11-193316 A | 7/1999 |
| JP | 11-202558 A | 7/1999 |
| JP | 11-343436 A | 12/1999 |
| JP | 2000-044858 | 2/2000 |
| JP | 2000-044861 A | 2/2000 |
| JP | 2000-336295 A | 12/2000 |
| JP | 2000-345080 A | 12/2000 |
| JP | 2000-355667 | 12/2000 |
| JP | 2001-348519 A | 12/2001 |
| JP | 2002-38063 | 2/2002 |
| JP | 2002-179960 A | 6/2002 |
| JP | 2002-225414 A | 8/2002 |
| JP | 2002-249165 | 9/2002 |
| JP | 2002-256189 A | 9/2002 |
| JP | 2002-529572 | 9/2002 |
| JP | 2002-292775 | 10/2002 |
| JP | 2002-332436 A | 11/2002 |
| JP | 2002-348513 | 12/2002 |
| JP | 2003-012971 A | 1/2003 |
| JP | 2003-055463 | 2/2003 |
| JP | 2003-055563 | 2/2003 |
| JP | 2003-096337 A | 4/2003 |
| JP | 2003-147233 | 5/2003 |
| JP | 2003-253148 A | 9/2003 |
| JP | 2003-292836 A | 10/2003 |
| JP | 2003-292857 | 10/2003 |
| JP | 2003-306625 A | 10/2003 |
| JP | 2003-311945 A | 11/2003 |
| JP | 2003-342499 A | 12/2003 |
| JP | 2004-009359 A | 1/2004 |
| JP | 2004-009360 A | 1/2004 |
| JP | 2004-018716 A | 1/2004 |
| JP | 2004-059857 | 2/2004 |
| JP | 2004-066817 A | 3/2004 |
| JP | 2004-161852 A | 6/2004 |
| JP | 2004-174971 | 6/2004 |
| JP | 2004-099796 A | 7/2004 |
| JP | 2004-195797 | 7/2004 |
| JP | 2004-197055 | 7/2004 |
| JP | 2004-216654 | 8/2004 |
| JP | 2004-250659 A | 9/2004 |
| JP | 2004-263139 A | 9/2004 |
| JP | 2004-264435 | 9/2004 |
| JP | 2004-535506 A | 11/2004 |
| JP | 2004-535508 A | 11/2004 |
| JP | 2004-359960 A | 12/2004 |
| JP | 2005-007577 | 1/2005 |
| JP | 2005-008690 | 1/2005 |
| JP | 2005-015813 A | 1/2005 |
| JP | 2005-023284 A | 1/2005 |
| JP | 2005-023299 A | 1/2005 |
| JP | 2005-060411 | 3/2005 |
| JP | 2005-060419 | 3/2005 |

(56) References Cited

FOREIGN PATENT DOCUMENTS

| | | |
|---|---|---|
| JP | 2005-068250 A | 3/2005 |
| JP | 2005-068251 A | 3/2005 |
| JP | 2005-068252 A | 3/2005 |
| JP | 2005-068439 A | 3/2005 |
| JP | 2005-96254 | 4/2005 |
| JP | 2005-161583 | 6/2005 |
| JP | 2005-187659 A | 7/2005 |
| JP | 2005-220352 | 8/2005 |
| JP | 2005-036079 A | 10/2005 |
| JP | 2005-290362 A | 10/2005 |
| JP | 2005-298757 A | 10/2005 |
| JP | 2005-314655 A | 11/2005 |
| JP | 2005-350551 | 12/2005 |
| JP | 2005-536375 A | 12/2005 |
| JP | 2006-070255 A | 3/2006 |
| JP | 2006-117795 A | 5/2006 |
| JP | 2006-117931 A | 5/2006 |
| JP | 2006-123529 | 5/2006 |
| JP | 2006-123542 A | 5/2006 |
| JP | 2006-137183 A | 6/2006 |
| JP | 2006-176734 A | 7/2006 |
| JP | 2006-199929 A | 8/2006 |
| JP | 2006-206875 A | 8/2006 |
| JP | 2006-101054 A | 9/2006 |
| JP | 2006-241194 | 9/2006 |
| JP | 2006-257302 A | 9/2006 |
| JP | 2006-257303 A | 9/2006 |
| JP | 2006-112031 A | 10/2006 |
| JP | 2006-265292 A | 10/2006 |
| JP | 2006-265524 A | 10/2006 |
| JP | 2006-272933 | 10/2006 |
| JP | 2006-274025 A | 10/2006 |
| JP | 2006-274029 | 10/2006 |
| JP | 2006-281538 | 10/2006 |
| JP | 2006-281568 | 10/2006 |
| JP | 2006-281570 | 10/2006 |
| JP | 2006-282822 | 10/2006 |
| JP | 2006-282823 | 10/2006 |
| JP | 2006-283017 | 10/2006 |
| JP | 2006-523762 A | 10/2006 |
| JP | 2006-312711 A | 11/2006 |
| JP | 2007-016103 A | 1/2007 |
| JP | 2007-023161 A | 2/2007 |
| JP | 2007-045989 A | 2/2007 |
| JP | 2007-045990 A | 2/2007 |
| JP | 2007-046034 | 2/2007 |
| JP | 2007-046034 A | 2/2007 |
| JP | 2007-055084 A | 3/2007 |
| JP | 2007-100053 A | 4/2007 |
| JP | 2007-100054 A | 4/2007 |
| JP | 2007-112970 A | 5/2007 |
| JP | 2007-131741 | 5/2007 |
| JP | 2007-138084 A | 6/2007 |
| JP | 2007-154087 | 6/2007 |
| JP | 2007-169306 A | 7/2007 |
| JP | 2007-169307 A | 7/2007 |
| JP | 2007-169308 A | 7/2007 |
| JP | 2007-169451 | 7/2007 |
| JP | 2007169451 A | 7/2007 |
| JP | 2007-191613 | 8/2007 |
| JP | 2007-211036 | 8/2007 |
| JP | 2007-254735 A | 10/2007 |
| JP | 2007-262272 | 10/2007 |
| JP | 2007-269017 | 10/2007 |
| JP | 2007-270085 | 10/2007 |
| JP | 2007-297586 | 11/2007 |
| JP | 2008-138045 | 6/2008 |
| JP | 2008-174712 | 7/2008 |
| JP | 2008155523 A | 7/2008 |
| JP | 2008155524 A | 7/2008 |
| JP | 2009-113494 | 5/2009 |
| JP | 2009-114454 | 5/2009 |
| JP | 2009-242441 | 10/2009 |
| JP | 2010-006062 | 1/2010 |
| JP | 2010-018651 A | 1/2010 |
| JP | 2010-090270 | 4/2010 |
| JP | 2010-090271 | 4/2010 |
| JP | 2010-094809 | 4/2010 |
| JP | 2010-094852 | 4/2010 |
| WO | 93/21235 | 10/1993 |
| WO | 93-21235 A | 10/1993 |
| WO | 99-05230 A | 2/1999 |
| WO | 00-52530 | 9/2000 |
| WO | 01-08895 A1 | 2/2001 |
| WO | 02-76764 A2 | 3/2002 |
| WO | 02-38687 A1 | 5/2002 |
| WO | 02-55619 A1 | 7/2002 |
| WO | 03/008510 A1 | 1/2003 |
| WO | WO-2004-018197 A1 | 3/2004 |
| WO | 2004-031308 A1 | 4/2004 |
| WO | 2004/052947 A1 | 6/2004 |
| WO | 2004/094534 A1 | 11/2004 |
| WO | 2004-104051 A1 | 12/2004 |
| WO | 2005/047405 | 5/2005 |
| WO | 2005-061566 A | 7/2005 |
| WO | 2005/089957 A1 | 9/2005 |
| WO | 2005/095006 A1 | 10/2005 |
| WO | 2006-041004 A | 4/2006 |
| WO | 2006/085992 A2 | 8/2006 |
| WO | 2006-87930 A1 | 8/2006 |
| WO | 2006/098676 A1 | 9/2006 |
| WO | 2006-101054 A | 9/2006 |
| WO | 2006-112031 A | 10/2006 |
| WO | 2007/026355 A2 | 3/2007 |
| WO | 2007/026366 A1 | 3/2007 |
| WO | 2007-060264 A | 5/2007 |

OTHER PUBLICATIONS

Patent Abstracts of Japan of JP 2002-348513 dated Dec. 4, 2002.
Patent Abstracts of Japan of JP 2004-059857 dated Feb. 26, 2004.
Patent Abstracts of Japan of JP 2004-174971 dated Jun. 24, 2004.
Patent Abstracts of Japan of JP 2004-216654 dated Aug. 5, 2004.
Patent Abstracts of Japan of JP 2005-007577 dated Jan. 13, 2005.
Patent Abstracts of Japan of JP 2007-046034 dated Feb. 22, 2007.
Patent Abstracts of Japan of JP 2007-131741 dated May 31, 2007.
Patent Abstracts of Japan of JP 2007-169451 dated Jul. 5, 2007.
Patent Abstracts of Japan of JP 2007-270085 dated Oct. 18, 2007.
Patent Abstracts of Japan of JP 2008-174712 dated Jul. 31, 2008.
Japanese Examination Result Issued on May 25, 2011.
Patent English Abstract and Machine Translation of Japanese Application 11-165420 Published Jun. 22, 1999.
Patent English Abstract and Machine Translation of Japanese Application 2004-195797 Published Jul. 15, 2004.
Patent English Abstract and Machine Translation of Japanese Application 2004-197055 Published Jul. 15, 2004.
Patent English Abstract of Japanese Application 2005-008690 Published Jan. 13, 2005.
European application's Search Report issued on Nov. 2, 2011.
U.S. application's Office Action issued on Nov. 10, 2011.
U.S. application's Office Action issued on Dec. 12, 2011.
U.S. application's Office Action issued on Dec. 21, 2011.
U.S. application's Office Action issued on Jan. 6, 2012.
Japanese application's Office Action issued on Feb. 28, 2012.
Computer Generated Translation of Japanese Application 11-343436A Published Dec. 14, 1999.
English Abstract of Japanese Application 2006-117931 Published May 11, 2006.
Office Action in Co-Pending U.S. Appl. No. 12/228,193 Issued on Mar. 8, 2012.
Examination Result of Japanese Application 2006-201363 Issued Dec. 27, 2011.
Computer-Generated Translation of Japanese Application 2005-187659A Published Jul. 14, 2005.
Patent English Abstract of Japanese Application 11-193316A Published Jul. 21, 1999.
Computer-Generated Translation of Japanese Application 2004-099796A Published Jul. 2, 2004.
Computer-Generated Translation of Japanese Application 2000-044861A Published Feb. 15, 2000.

(56) References Cited

OTHER PUBLICATIONS

Computer-Generated Translation of Japanese Application 2005-023284A Published Jan. 27, 2005.
Machine Translation of Japanese Application No. 2006-274029 Published Oct. 12, 2006.
Machine Translation of Japanese Application No. 2006-123529 Published May 18, 2006.
Machine Translation of Japanese Application No. 2005-96254 Published Apr. 14, 2005.
Computer-Generated Translation of Japanese 2003-096337A Published Apr. 3, 2003.
Computer-Generated Translation of Japanese 2002-332436A Published Nov. 22, 2002.
Patent English Abstract of Japanese 2004-359960A Published Dec. 24, 2004.
Patent English Abstract of Japanese 2002-225414A Published Aug. 14, 2002.
Computer-Generated Translation of Japanese 2007-045989A Published Feb. 22, 2007.
Patent English Abstract of Japanese 11-202558A Published Jul. 30, 1999.
Patent English Abstract of Japanese 08-295836A Published Nov. 12, 1996.
Patent English Abstract of Japanese 2004-066817A Published Mar. 4, 2004.
Computer-Generated Translation of Japanese 2006-117795A Published May 11, 2006.
Abstract and Machine Translation of Japanese 2003-055463 Published Feb. 26, 2003.
Abstract and Machine Translation of Japanese 2003-055563 Published Feb. 26, 2003.
Abstract of Japanese 02-211452 Published Aug. 22, 1990.
U.S. Appl. No. 11/250,156, filed Oct. 13, 2005.
U.S. Appl. No. 12/506,305, filed Jul. 21, 2009.
U.S. Appl. No. 11/887,464, filed Mar. 29, 2006.
U.S. Appl. No. 11/634,199, filed Dec. 5, 2006.
U.S. Appl. No. 11/789,569, filed Apr. 25, 2007.
U.S. Appl. No. 11/901,083, filed Sep. 14, 2007.
U.S. Appl. No. 11/975,704, filed Oct. 19, 2007.
U.S. Appl. No. 12/011,834, filed Jan. 29, 2008.
U.S. Appl. No. 12/021,855, filed Jan. 29, 2008.
U.S. Appl. No. 12/913,696, filed Oct. 27, 2010.
U.S. Appl. No. 13/240,667, filed Sep. 22, 2011.
U.S. Appl. No. 13/545,091, filed Jul. 10, 2012.
U.S. Appl. No. 12/074,308, filed Mar. 3, 2008.
U.S. Appl. No. 11/998,469, filed Nov. 29, 2007.
U.S. Appl. No. 13/197,174, filed Aug. 3, 2011.
U.S. Appl. No. 11/980,093, filed Oct. 30, 2007.
U.S. Appl. No. 12/002,497, filed Dec. 17, 2007.
U.S. Appl. No. 12/074,532, filed Mar. 4, 2008.
U.S. Appl. No. 12/228,193, filed Aug. 11, 2008.
U.S. Appl. No. 12/228,224, filed Aug. 11, 2008.
U.S. Appl. No. 12/154,478, filed May 23, 2008.
U.S. Appl. No. 12/284,225, filed Sep. 18, 2008.
U.S. Appl. No. 12/894,423, filed Sep. 30, 2010.
U.S. Appl. No. 12/317,766, filed Dec. 29, 2008.
U.S. Appl. No. 12/394,336, filed Feb. 27, 2009.
U.S. Appl. No. 12/497,730, filed Jul. 6, 2009.
U.S. Appl. No. 12/911,749, filed Oct. 26, 2010.
Laromer UA 9029 V. Technical Information Sheet, Dec. 2003.
Irgacure 127 Photoinitiator, Technical Data Sheet From Ciba Specialty Chemicals, 2004.
Irgacure 819 Photoinitiator, Technical Data Sheet From Ciba Specialty Chemicals, 2004.
Abstract and Machine Translation of Japanese Application 2003-306625A Published Oct. 31, 2003.
Abstract and Machine Translation of Japanese Application 2006-070255A Published Mar. 16, 2006.
Abstract and Machine Translation of Japanese Application 2005-036079A Published Oct. 2, 2005.
BYK Additives & Instruments. Data Sheet S212, Issued Jul. 2008 for BYK-UV 3500,3510,3530, and 3570. [Online], [Retrieved on May 6, 2010].
Ciba Darocur EDB (Product Technical Disclosure, Feb. 20, 2003 [Online] , [Retrieved on May 6, 2010].
Ciba Igrastab UV-22 (Product Disclosure). [Online] , [Retrieved on May 6, 2010].
Ciba Irgacure 369 Phtoinitiator Product Disclosure, Issued Apr. 9, 2001. [Online] ,[ Retrieved on May 6, 2010].
Journal of American Chemistry Society,112, pp. 7638-7647(1990).
Patent English Abstract of Japanese 01-238656A Published Sep. 22, 1989.
Abstract and Translation of Japanese 03-216379A Published Sep. 24, 1991.
Abstract and Machine Translation of Japanese 05-186725A Published Jul. 27, 1993.
Abstract and Machine Translation of Japanese 08-218018A Published Aug. 27, 1996.
Abstract and Machine Translation of Japanese 10-287035A Published Oct. 27, 1998.
Patent English Abstract of Japanese 2000-336295A Published Dec. 5, 2000.
Abstract and Machine Translation of Japanese 2001-348519A Published Dec. 18, 2012.
Abstract and Machine Translation of Japanese 2002-179960A Published Jun. 26, 2002.
Abstract and Machine Translation of Japanese 2003-012971A Published Jan. 15, 2003.
Abstract and Machine Translation of Japanese 2003-253148A Published Sep. 10, 2003.
Abstract and Machine Translation of Japanese 2003-292836A Published Oct. 15, 2003.
Abstract and Machine Translation of Japanese 2003-311945A Published Nov. 6, 2003.
Abstract and Machine Translation of Japanese 2004-018716A Published Jan. 22, 2004.
Abstract and Translation of Japanese 2004-250659A Published Sep. 9, 2004.
Patent English Abstract of Japanese 2004-263139A Published Sep. 24, 2004.
Patent English Abstract of Japanese 2005-023299A Published Jan. 27, 2005.
Patent English Abstract of Japanese 2005-068250A Published Mar. 17, 2005.
Patent English Abstract of Japanese 2005-068252A Published Mar. 17, 2005.
Patent English Abstract of Japanese 2005-290362A Published Oct. 20, 2005.
Abstract and Machine Translation of Japanese Application 2005-298757A Published Oct. 27, 2005.
Abstract of Japanese Application 2005-314655A Published Nov. 10, 2005.
Abstract and Machine Translation of Japanese Application 2006-123542A Published May 18, 2006.
Abstract and Machine Translation of Japanese 2006-176734A Published Jul. 6, 2006.
Abstract of Japanese Application2006-199929A Published Aug. 3, 2006.
Abstract of Japanese Application 2006-206875A Published Aug. 10, 2006.
Abstract of Japanese Application 2006-257302A Published Sep. 28, 2006.
Abstract of Japanese Application 2006-257303A Published Sep. 28, 2006.
Abstract of Japanese Application 2006-265292A Published Oct. 5, 2006.
Abstract and Machine Translation of Japanese Application 2006-265524A Published Oct. 5, 2006.
Abstract of Japanese 2006-274025APublished Oct. 12, 2006.
Abstract of Japanese Application 2007-016103A Published Jan. 25, 2007.
Abstract and Machine Translation of Japanese Application 2007-023161A Published Feb. 1, 2007.

(56) References Cited

OTHER PUBLICATIONS

Abstract of Japanese Application 2007-045990A Published Feb. 22, 2007.
Abstract of Japanese Application 2007-055084A Published Mar. 8, 2007.
Abstract and Machine Translation of Japanese Application 2007-100053A Published Apr. 19,L 2007.
Abstract and Machine Translation of Japanese Application 2007-100054A Published Apr. 19, 2007.
Abstract and Machine Translation of Japanese Application 2007-112970A Published May 10, 2007.
Abstract and Machine Translation of Japanese Application 2007-138084A Published Jun. 7, 2007.
Abstract of Japanese Application 2007-169306A Published Jul. 5, 2007.
Abstract of Japanese Application 2007-169307A Published Jul. 5, 2007.
Abstract of Japanese Application 2007-169308A Published Jul. 5, 2007.
Abstract of Japanese Application 2007-269017 Published Oct. 18. 2007.
Kim, Y.H.Highly Branched Aromatic Polymers Prepared by Single Step Synthesis, Macromol. Symp. 77 (1994), pp. 21-33).
Macromolecules 29 (1996) 3831-3838.
Search Report Issued on Apr. 21, 2008 for the Related European Patent Application No. 07024545.1.
Abstract and Machine Translation of Japanese Application 2004-161852A Published, Jun. 10, 2004.
Final Office Action Issued on Jun. 8, 2012for the Related U.S. Appl. No. 12/074,308.
Office Action Issued on Nov. 30, 2010 for the Related Chinese Patent Application No. 200910004654.0 With Translation.
Office Action Issued on Mar. 9, 2011for the Related Japanese Patent Application No. 2007-316368 With Translation.
(Bruce M. Monroe ,Chemical Revue 93, pp. 435-448 1993 ).
(Dispersion definition from Hawley's Condensed Chemical Dictionary. [online]. 2007. [retrived on Oct. 22, 2010]).
(Dispersion-Wikipedia Definition,[online]. last modified Oct. 22, 2010. [retrived on Oct. 22, 2010]).
H.B. Shuster et al. , Journal of American Chemistry Society, 112, pp. 6329-6338 1990.
I.D.F. Eaton et al, Journal of American Chemistry Society, 102, pp. 3278-3281 1980.
J.P. Faussier "Photoinitiated Polymerization-Theory and Applications" Rapra Review Vol. 9, Report, Rapra Technology 1998.
Abstract and Translation of Japanese Applicatio N 04-018462A Published Jan. 22, 1992.
Patent English Abstract of Japanese Application 10-120956A Published May 12, 1998.
Patent English Abstract of Japanese 2000-345080A Published Dec. 12, 2000.
Abstract and Machine Translation of Japanese 2003-342499A Published Dec. 3, 2003.
Abstract and Machine Translation of Japanese 2004-009360A Published Jan. 15, 2004.
Abstract and Machine Translation of Japanese 03-079678A Published Apr. 4, 1991.
(M.Tsunooka et al. Prog.Polym.Sci.,Jan. 21, 1996 ).
Office Action issued on Jun. 2, 2011for the related U.S. Appl. No. 12/228,193.
(R.S.Davidson ,,Journal of Photochemistry and biology A Chemistry,73, pp. 81-96 1993 ).
(Radiation Curing in Polymer Science and Technology. J.P.Fouassier J.F.Rabek 1993 , 77 117).
Search Report issued on Dec. 29, 2008 for the related European Patent Application No. 08016440.3.
Search Report issued on Sep. 16, 2008 for the related PCT Patent Application No. PCT/JP2008/064126.
(Joem Handbook 3, Organic Material for Imaging, 1993 ,187 192.
Notice of Allowance issued on Oct. 20, 2011 for the related U.S. Appl. No. 12/228,224.
Office Action issued on Jun. 2. 2011for the related U.S. Appl. No. 12/228,224.
Step et al Macromolecules, 1994, 27, 2529-2539.
Supplemental Notice of Allowance issued on Jun. 28, 2012 for the related U.S. Appl. No. 12/228,224.
Final Office Action issued on May 29, 2012 for the related U.S. Appl. No. 12/894,423.
Japanese Application 02-009596 Published Mar. 2, 1990.
Japanese Application 03-79678 Published Apr. 4, 1991.
Japanese Application 57-30704 Published Aug. 19, 1982 With Translation.
Patent English Abstract of Japanese Application 62-00142 Published Jan. 7, 1987 With Translation.
Japanese Application 2-9596 Published Mar. 2, 1990 With Translation.
Abstract and Machine Translation of Japanese 03-056573 Published Mar. 12, 1991.
Japanese Application 03-79678 Published Apr. 4, 1991 With Translation.
Abstract and Machine Translation of Japanese 2004-264435 Published Sep. 24, 2004.
Abstract and Machine Translation of Japanese 2005-350551 Published Dec. 22, 2005.
Abstract and Machine Translation of Japanese 2006-241194 Published Sep. 14, 2006.
Abstract of Japanese 2006-283017 Published Oct. 19, 2006.
Abstract and Machine Translation of Japanese 2007-191613 Published Aug. 2, 2007.
Abstract and Machine Translation of Japanese 2008-138045 Published Jun. 19, 2008.
Japanese Application 57-30704 Published Feb. 19, 1982 With Translation.
Abstract of Japanese 62-001426 Published Jan. 7, 1987 With Translation.
Abstract and Machine Translation ofJapanese 2003-147233 Published May 21, 2003.
Abstract and Machine Translation of Japanese 2003-292857 Published Oct. 14, 2003.
F.D. Saeva, Topics in Current Chemistry, 156,59 1990.
Final Office Action on Oct. 14, 2011 for the Related U.S. Appl. No. 12/228,193.
G.G. Maslak, Topics in Current Chemistry . 168, Jan. 1993.
Search Report issued on May 11, 2011 for the related European Patent Application No. EP11152226.4.

* cited by examiner

METHOD OF FORMING OPAQUE LAYER, RECORDING PROCESS, INK SET, INK CARTRIDGE, AND RECORDING APPARATUS

BACKGROUND

1. Technical Field

The present invention relates to a method of forming an opaque layer, a recording process, an ink set, an ink cartridge, and a recording apparatus.

2. Related Art

In a case of printing on a non-white record medium, such as a chromatic, black, metallic, transparent, or translucent object, it is known a trouble that no satisfactory image quality is obtained because that the background is seen through the image recorded on such a medium. This trouble is noticeable when the concentration of color material used is low and thereby the capability of hiding the background, that is, the hiding property, is low. The trouble can be slightly alleviated by increasing the concentration of the color material, but the background is still seen at portions where the concentration of the color material is low. Consequently, this method is not an essential solution.

It is known a method for preventing the background from being seen in screen printing or gravure printing, when the printing is performed on a record medium such as the above, by printing a white opaque undercoat layer in advance (for example, refer to JP-A-2005-007577). In this method, it is necessary to print the white opaque layer and to dry or solidify the layer before forming an objective image, resulting in an increase in the number of steps. Thus, this method has disadvantages that necessary time and cost are high. Furthermore, this method for hiding the background requires the use of an ink composition containing a pigment at a high concentration and having a high viscosity for imparting a satisfactory degree of whiteness to the undercoat layer. Consequently, it is not necessarily easy to apply the method of hiding the background to an ink-jet recording system. For example, the hiding property of a white ink having a viscosity that can be applied to the ink-jet recording system is insufficient.

SUMMARY

An advantage of some aspects of the invention is to provide a method of forming an opaque layer that hardly allows the background being seen on a record medium.

An advantage of some aspects of the invention is to provide a recorded matter where an opaque layer that hardly allows the background being seen is formed on a record medium.

An advantage of some aspects of the invention is to provide a recorded matter where an image is recorded on an opaque layer hardly allowing the background being seen formed on a record medium.

An advantage of some aspects of the invention is to provide a non-aqueous opaque ink composition that can form an opaque layer hardly allowing the background being seen and having a satisfactory degree of whiteness on a record medium.

An advantage of some aspects of the invention is to provide an ink set, an ink cartridge, and a recording apparatus that are suitable for the method of forming an opaque layer hardly allowing the background being seen on a record medium.

A method of forming an opaque layer according to the invention includes forming a first layer by discharging droplets of an ink composition containing a metallic pigment on a record medium by an ink-jet recording process; and forming a second layer by discharging droplets of an ink composition containing a white pigment on the record medium by an ink-jet recording process, wherein an opaque layer is formed on the record medium on the side where the first layer and the second layer are formed in a region where the first layer and the second layer overlap each other.

By doing so, an opaque layer hardly allowing the background being seen can be formed on the record medium.

In the method of forming an opaque layer of the invention, the first layer can be closer to the record medium than the second layer is.

In the method of forming an opaque layer of the invention, the second layer can be closer to the record medium than the first layer is.

The method of forming an opaque layer of the invention can further include forming a third layer using an ink composition containing a metallic pigment on the second layer on the opposite side with respect to the record medium.

The method of forming an opaque layer of the invention can further include forming a fourth layer using an ink composition containing a white pigment on the first layer on the opposite side with respect to the record medium.

A method of forming an opaque layer of the invention includes mixing an ink composition containing a metallic pigment and an ink composition containing a white pigment to prepare an opaque ink composition; and forming an opaque layer by discharging droplets of the opaque ink composition on a record medium by an ink-jet recording process.

By doing so, an opaque layer hardly allowing the background being seen and having a satisfactory degree of whiteness can be formed on a record medium.

In the method of forming an opaque layer of the invention, the opaque ink composition can include the ink composition containing a metallic pigment and the ink composition containing a white pigment at a mass ratio in the range of 1:3 to 3:1.

In the method of forming an opaque layer of the invention, the metallic pigment can be aluminum or an aluminum alloy.

In the method of forming an opaque layer of the invention, the metallic pigment can be plate-like particles having a 50% average particle diameter R50 of 0.5 to 3 µm, which is based on circle-equivalent diameters determined from the areas of X-Y planes of the plate-like particles where X is the major axis Y is the minor axis of the flat surface and Z is the thickness of the plate-like particles.

In the method of forming an opaque layer of the invention, the ink composition can contain hollow resin particles as the white pigment.

In the method of forming an opaque layer of the invention, the hollow resin particles can have an average particle diameter of 0.2 to 1.0 µm.

In the method of forming an opaque layer of the invention, the record medium can be one selected from colorless transparent, translucent, colored transparent, colored translucent, chromatic opaque, and achromatic opaque objects.

In the method of forming an opaque layer of the invention, the record medium can be an record medium having an image formed thereon.

In the method of forming an opaque layer of the invention, the $L^*$ value of the opaque layer can be 55 or higher.

A recording process according to the invention includes
forming an image on the opaque layer formed by the above-described method of forming an opaque layer.

By doing so, a recorded matter where an image is recorded on an opaque layer hardly allowing the background being seen is formed on a record medium can be obtained.

An ink set according to the invention includes
the ink composition containing a metallic pigment and the ink composition containing a white pigment that are used in the method of forming an opaque layer.

An ink cartridge according to the invention includes the above-described ink set.

A recording apparatus according to the invention includes the above-described ink cartridge.

DESCRIPTION OF EXEMPLARY EMBODIMENTS

Preferred embodiments of the invention will be described in detail below.

1. First Embodiment 1.1. Opaque Layer

The opaque layer formed by a method of forming an opaque layer according to this embodiment can have various aspects. That is, in a record medium on which a metal layer containing a metallic pigment and a white layer containing a white pigment are formed, the opaque layer according to this embodiment is formed on the record medium on the side where these layers are formed in a region where these layers overlap each other.

The metal layer and the white layer can overlap each other in arbitrary order. That is, when the metal layer is a first layer and the white layer is a second layer, the first layer may be closer to the record medium than the second layer, or the second layer may be closer to the record medium than the first layer. Furthermore, a plurality of the first layers and/or a plurality of the second layers may be provided. For example, on an opaque layer composed of a first layer and a second layer formed in this order from the record medium side, another first layer may be further formed. In this case, the first layer formed on the opposite side of the opaque layer with respect to the record medium may be called a third layer as a matter of convenience. Furthermore, for example, on an opaque layer composed of a second layer and a first layer formed in this order from the record medium side, another second layer may be further formed. In this case, the second layer formed on the opposite side of the opaque layer with respect to the record medium may be called a fourth layer as a matter of convenience.

Specifically, the opaque layer of this embodiment can have a configuration as follows: for example, (1) a metal layer and a white layer overlapping each other are arranged in this order from the record medium side, (2) a white layer and a metal layer overlapping each other are arranged in this order from the record medium side, (3) a white layer, a metal layer, and a white layer overlapping one another are arranged in this order from the record medium side, (4) a metal layer, a white layer, a metal layer, and a white layer overlapping one another are arranged in this order from the record medium side, or (5) a plurality of the metal layers and a plurality of the white layers are alternately arranged so as to overlap one another on the record medium.

The opaque layer of this embodiment is not limited to the above-mentioned configurations and may be composed of a larger number of layers. Furthermore, a layer other than the metal layer and the white layer, for example, a chromatic ink layer may be laminated.

The opaque layer of this embodiment is formed on the record medium in a region where the metal layer and the white layer overlap each other in the view from above the record medium. In also the above-mentioned configurations, the opaque layer of this embodiment is a region where at least one metal layer and at least one white layer overlap each other in the plan view from above the record medium.

When an opaque layer formed by the method of forming an opaque layer of this embodiment has the configuration of the above (1), the opaque layer has high whiteness and a high background-hiding property in the view from above the record medium. Consequently, in this case, the disadvantage that the background is seen can be suppressed regardless of the type of the record medium. In addition, in this case, since the upper surface of the opaque layer has a high degree of whiteness, a high-quality image can be recorded on this opaque layer by, for example, printing. Furthermore, an image may be formed on the metal layer side of the opaque layer (for example, between a colorless transparent or colored transparent record medium and an opaque layer or on the lower surface of the record medium), so that this image is formed on the lustrous metal surface having a high background-hiding property.

When an opaque layer formed by the method of forming an opaque layer of this embodiment has the configuration of the above (2), the opaque layer has high whiteness and a high background-hiding property in the view from below the record medium. That is, a disadvantage that the background of the opaque layer is seen in the view from below the record medium is suppressed. In addition, in this case, since the lower surface of the opaque layer has a high degree of whiteness, when the record medium is, for example, colorless transparent or colored transparent, a high-quality image can be recorded between the record medium and the opaque layer or on the lower surface of the record medium by, for example, printing. Furthermore, an image may be formed on the metal layer side of the opaque layer (namely, the upper surface of the opaque layer), so that this image is formed on the lustrous metal surface having a high background-hiding property.

When an opaque layer formed by the method of forming an opaque layer of this embodiment has the configuration of the above (3), the opaque layer has high whiteness and a high background-hiding property in the views from above and below the record medium. That is, a disadvantage that the background of the opaque layer is seen when viewed from above or below the record medium is suppressed. In addition, in this case, since the upper surface and the lower surface of the opaque layer have a high degree of whiteness, an image with high quality can be recorded on this opaque layer by, for example, printing. Furthermore, in this case, when the record medium is, for example, a colorless transparent or colored transparent object, a high-quality image can be also recorded between the record medium and the opaque layer or on the lower surface of the record medium by, for example, printing.

The opaque layer formed by the method of forming an opaque layer of this embodiment can have a configuration in which the configuration of the above (1) is repeated as in the configuration of the above (4) and further may have a configuration in which the configuration of the above (2) or (3) is repeated. The opaque layer formed by the method of forming an opaque layer of this embodiment may have a configuration in which a plurality of the metal layers and a plurality of the white layers are alternately arranged so as to overlap one another on the record medium as in the configuration of the above (5). These opaque layers can have, for example, higher background-hiding properties and higher degrees of whiteness.

The L* value measured from the white layer side of the opaque layer of this embodiment is preferably 55 or more, more preferably 65 or more, and most preferably 75 or more. When the L* value is lower than 55, the whiteness is insufficient, which is disadvantageous. The L* value is used as an index of whiteness, and a larger L* value indicates a higher degree of whiteness of the measured portion.

In this Description, the phrase "a B member is disposed "on" an A member" includes a case in which the B member is directly disposed on the A member and a case in which the B member is disposed above the A member via another member therebetween.

1.2. Record Medium

The record medium having the opaque layer according to this embodiment is not particularly limited and can be selected depending on the application of a recorded matter. For example, the record medium is selected from colorless transparent, translucent, colored transparent, colored translucent, chromatic opaque, and achromatic opaque objects.

When the opaque layer according to this embodiment has a configuration of, for example, the above (1), a white surface that hides the background can be provided. Accordingly, any record medium that can be used in an ink-jet recording process can be used. In this case, the record medium is hidden by the opaque layer in the view from above the record medium, and a satisfactory white surface can be provided on the opaque layer. Furthermore, the record medium having, for example, an image can be used. In addition, in a record medium that is opaque and has an image thereon, the opaque layer may be a white opaque one when this image is required to be hidden by the opaque layer.

When the opaque layer according to this embodiment has a configuration of, for example, the above (2), a white surface hiding the background, in the view from below the record medium, can be provided. Accordingly, the record medium can be applied to an ink-jet recording process. By selecting a colorless transparent, translucent, colored transparent, or colored translucent record medium, the background can be hidden by the opaque layer when viewed from below the record medium. Thus, a satisfactory white background, in the view from below the record medium, can be obtained. Furthermore, in this case, a record medium having, for example, an image can be also used. In addition, a so-called backlight film is further preferred as a transparent or translucent record medium having an image. In this embodiment, the image of a recorded matter obtained using the backlight film is observed from the back side of the recording face having the image (through the backlight film). With this, an image having higher quality can be provided with a satisfactory white background having a high hiding property. Examples of the backlight film include backlight films for ink-jet recording whose transparent resin layers are made of polyester or polyvinyl chloride.

1.3. Method of Forming Opaque Layer

The method of forming an opaque layer according to this embodiment includes a step of forming a metal layer and a step of forming a white layer on a record medium. By these steps, for example, the above-mentioned first to fourth layers are formed on the record medium. Each step will be described in detail below.

1.3.1. Step of Forming Metal Layer

The step of forming a metal layer in the method of forming an opaque layer according to this embodiment is carried out by discharging droplets of an ink composition containing a metallic pigment on a record medium by an ink-jet recording process. The thickness of the metal layer is preferably 0.01 to 10 μm and more preferably 0.02 to 5 μm. When the thickness of the metal layer is less than 0.01 μm, the hiding property of the opaque layer may be insufficiently low. On the other hand, when the thickness of the metal layer is larger than 10 μm, the flexibility of the record medium may be deteriorated. In this step of forming the metal layer, the first layer or the third layer described in the "1.1. Opaque Layer" paragraph can be formed.

(1) Ink-Jet Recording Process

This step is carried out by an ink-jet recording process. The ink-jet recording apparatus that can be used in the ink-jet recording process of this step is not particularly limited as long as the apparatus can discharge droplets of an ink composition containing a metallic pigment for attaching the droplets to a record medium to form, for example, an image.

Examples of the recording system of the ink-jet recording apparatus include a system for recording by applying a strong electric field between a nozzle and an acceleration electrode disposed in the front of the nozzle, continuously ejecting ink droplets from the nozzle, and giving printing information signals to polarization electrodes while the ink droplets are flying between the polarization electrodes or by ejecting the ink droplets according to printing information signals without polarizing the ink droplets (electrostatic suction system); a system for recording by applying a pressure to an ink liquid with a compact pump and forcibly ejecting the ink droplets by mechanically vibrating the nozzle with, for example, a crystal oscillator; a system for recording by simultaneously applying a pressure and a printing information signal to an ink liquid with a piezoelectric device and ejecting the ink droplets (piezo system); and a system for recording by foaming an ink liquid by heating it with a microelectrode according to a printing information signal and ejecting the ink droplets (thermal jet system).

Since the ink-jet recording process can discharge a constant amount of an ink composition on a record medium, the metal layer can have a uniform thickness. Furthermore, the recording may be repeated a plurality of times in order to obtain a desired thickness of the metal layer.

This step is carried out by the ink-jet recording process. Consequently, the number of procedures is less than that in the case of forming the metal layer by metal deposition such as sputtering, foil stamping printing where metal foil is pasted, or a thermal transfer system where metal foil is deposited and transferred. Thus, the metal layer can be advantageously formed in terms of time and cost savings, and environmental load is also low.

(2) Ink Composition Containing Metallic Pigment

An ink composition (hereinafter, occasionally referred to as "metallic ink composition") containing a metallic pigment used in the method of forming an opaque layer of this embodiment contains at least a metallic pigment.

(2-1) Metallic Pigment

The metallic ink composition used in this step may contain any metallic pigment within the range in which droplets of the ink composition can be discharged by an ink-jet recording process. When the metallic ink composition is attached to the upside of a record medium, the metallic pigment imparts a background-hiding property to the attached matter and also can impart a metallic luster to the attached matter. Examples of the metallic pigment include particles of silver, gold, platinum, nickel, chromium, tin, zinc, indium, titanium, or copper. These metallic pigments can be used alone, as an alloy thereof, or as a mixture thereof.

The metallic pigment used in this embodiment is preferably aluminum or an aluminum alloy from the viewpoints of their high background-hiding properties and low costs. In the aluminum alloy, any metal element or non-metal element may be added to aluminum without particular limitation as long as it has a background-hiding property, and examples of such elements include silver, gold, platinum, nickel, chromium, tin, zinc, indium, titanium, and copper. At least one element selected from these elements can be preferably used.

The particle size distribution (CV value) of the metallic pigment is determined by the following equation (1).

$$CV \text{ value} = (\text{standard deviation of particle size distribution})/(\text{average particle diameter}) \times 100. \quad (1)$$

The CV value of the metallic pigment is preferably 60 or less, more preferably 50 or less, and most preferably 40 or less. By selecting a metallic pigment having a CV value of 60 or less, excellent printing stability of the metallic ink composition can be achieved in the ink-jet recording process.

In the use of a metallic pigment mentioned above, there may be restriction such that the metallic pigment must have a size allowing discharge of droplets of the metallic ink composition with an ink-jet recording apparatus or viscosity of the metallic ink composition must not be too high. Because of these reasons, so-called plate-like particles are further preferred as the metallic pigment. By using such a metallic pigment, the background-hiding property of the metal layer formed on a record medium can be further enhanced. In addition, by using such a metallic pigment, the metallic ink composition can be further readily applied to an ink-jet recording process. Consequently, for example, the concentration of the metallic pigment in the metallic ink composition can be increased, and the background-hiding property of the metal layer can be further increased.

The term "plate-like particle" refers to a particle having an approximately flat surface (X-Y plane) and an approximately uniform thickness. The particles having an approximately flat surface and an approximately uniform thickness can be given by crushing a metal deposition film of a metallic pigment. Accordingly, the major axis and the minor axis of the flat surface of the plate-like particle can be defined as X and Y, respectively, and the thickness can be defined as Z.

When the metallic pigment is in a plate-like particle form and the major axis and the minor axis of the flat surface of the particle are defined as X and Y, respectively, and the thickness of the particle is defined as Z, it is preferable that the 50% average particle diameter R50 based on circle-equivalent diameters determined from the X-Y plane area of the plate-like particles be 0.5 to 3 μm and a condition of R50/Z>5 be satisfied. The 50% average particle diameter R50 is more preferably 0.75 to 2 μm. When the 50% average particle diameter R50 based on circle-equivalent diameters is smaller than 0.5 μm, an image formed may have an insufficient background-hiding property. On the other hand, when the 50% average particle diameter R50 based on circle-equivalent diameters is larger than 3 μm, the printing stability may be insufficiently low. The relationship between the 50% average particle diameter R50 based on circle-equivalent diameters and the thickness Z preferably satisfies the condition of R50/Z>5. By satisfying the condition of R50/Z>5, a metal layer having a high background-hiding property can be formed. When the R50/Z is 5 or less, the metal layer formed may have an insufficient background-hiding property.

On the other hand, when the 50% average particle diameter R50 based on circle-equivalent diameters is larger than 3 μm, the printing stability may be insufficiently low. The relationship between the 50% average particle diameter R50 based on circle-equivalent diameters and the thickness Z preferably satisfies the condition of R50/Z>50. By satisfying the condition of R50/Z>50, a metal layer having a high background-hiding property can be formed. When the R50/Z is 5 or less, the metal layer formed may have an insufficient background-hiding property.

The maximum particle diameter Rmax based on circle-equivalent diameters determined from the X-Y plane area of the plate-like particles is preferably 10 μm or less from the viewpoint of preventing the occurrence of clogging by the ink composition in the ink jet recording apparatus. By regulating the Rmax to 10 μm or less, clogging of, for example, the nozzle of the ink jet recording apparatus and a filter for removing foreign substances disposed in an ink channel can be prevented.

The term "circle-equivalent diameter" herein is the diameter of a circle that has the same area as the projected image of the plate-like particle having an approximately flat surface (X-Y plane). For example, when the approximately flat surface (X-Y plane) of the plate-like particle is a polygon, the projected image of the polygon is converted to a circle and the diameter of the circle is the circle-equivalent diameter.

The 50% average particle diameter R50 based on circle-equivalent diameters of the plate-like particles is the circle-equivalent diameter at the 50% point of the total number of the measured particles in a number (frequency) distribution of the particles versus circle-equivalent diameters.

The major axis X, the minor axis Y of the flat surface of the plate-like particle and its circle-equivalent diameter can be measured with, for example, a particle image analyzer. As the particle image analyzer, for example, a flow-type particle image analyzer, FPIA-2100, FPIA-3000, or FPIA-3000A, from Sysmex Corp. can be used.

The metallic pigment composed of the plate-like particles can be produced by, for example, as follows: In pigment composite raw material having a structure in which a resin layer for detachment and a metal or metal compound layer are laminated in series on a surface of a sheet-type base material, the metal or metal compound layer is peeled from the sheet-type base material at the interface with the resin layer for detachment as the boundary and is pulverized to give fine plate-like particles.

The metal or metal compound layer is preferably formed by vacuum deposition, ion plating, or sputtering.

The thickness of the metal or metal compound layer is preferably 20 nm or more and 100 nm or less. With such a thickness, pigment particles having an average thickness of 20 nm or more and 100 nm or less can be prepared. A thickness of 20 nm or more can provide excellent reflection and luster properties to increase performance as a metallic pigment. At the same time, a thickness of 100 nm or less suppresses an increase in apparent specific gravity and can secure dispersion stability of the metallic pigment in an ink composition.

The resin layer for detachment of the pigment composite raw material is an undercoat layer for the metal or metal compound layer and also serves as a peelable layer for improving the peeling property of the metal or metal compound layer from the surface of the sheet-like base material. The resin used for the resin layer for detachment is preferably polyvinyl alcohol, polyvinyl butyral, polyethylene glycol, polyacrylic acid, polyacrylamide, a cellulose derivative, an acrylic acid polymer, or a denatured nylon resin.

The resin layer for detachment can be formed by applying a solution of one or more of the above-mentioned resins to a sheet-like base material and drying the resulting coating. After the application, an additive such as a viscosity controlling agent can be applied.

The resin layer for detachment can be coated by a well-known process, such as gravure printing, roll coating, blade coating, extrusion coating, dip coating, or spin coating, which are generally used. After the coating and drying, the surface may be smoothed by calender treatment if necessary.

The thickness of the resin layer for detachment is not particularly limited, but is preferably 0.5 to 50 µm and more preferably 1 to 10 µm. A thickness smaller than 0.5 µm is insufficient in the amount as a dispersion resin, and a thickness larger than 50 µm makes the resin layer readily peel off at the interface with the pigment layer when the sheet-like base material is rolled up.

The sheet base material is not particularly limited, and examples of the sheet-like base material include polyester films such as polytetrafluoroethylene, polyethylene, polypropylene, and polyethylene terephthalate films; polyamide films such as Nylon 66 and Nylon 6 films; and mold-releasing films such as polycarbonate films, triacetate films, and polyimide films. Among them, preferred are films of polyethylene terephthalate or copolymers thereof.

The thickness of the sheet-like base material is not particularly limited, but is preferably 10 to 150 µm. A thickness of 10 µm or more does not cause problems in handling during the step, and a thickness of 150 µm or less provides flexibility and does not cause problems in rolling and peeling off.

The metal or metal compound layer may be disposed between protection layers as described in JP-A-2005-68250. Examples of the protection layers include silicon oxide layers and resin layers for protection.

The silicon oxide layer is not particularly limited as long as it contains silicon oxide, and is preferably formed by a sol-gel method from a silicon alkoxide, such as tetraalkoxysilane, or a polymer thereof. A coating film of a silicon oxide layer is formed by application of an alcohol solution dissolving a silicon alkoxide or a polymer thereof and baking the resulting coating.

The resin layer for protection may be formed of any resin that is not dissolved in the dispersion solvent, and examples of the resin include polyvinyl alcohol, polyethylene glycol, polyacrylic acid, polyacrylamide, and cellulose derivatives. Among them, polyvinyl alcohol and the cellulose derivatives are preferred.

The resin layer for protection can be formed by applying an aqueous solution of one or more of the above-mentioned resins and drying the resulting coating. The coating solution can contain an additive such as a viscosity-controlling agent. The applications of the silicon oxide and the resin are carried out by the same procedure as in the resin layer for detachment.

The thickness of the resin layer for protection is not particularly limited, but is preferably in the range of 50 to 150 nm. A thickness of smaller than 50 nm is insufficient in the mechanical strength. A thickness of larger than 150 nm provides excessively high strength, which makes pulverization and dispersion difficult and may make the metal or metal compound layer being peeled off at the interface.

In addition, as exemplified in JP-A-2005-68251, a color material layer may be disposed between the "protection layer" and the "metal or metal compound layer".

The color material layer is introduced for obtaining a pigment composite having optional color and is not particularly limited as long as it can contain a color material that can provide optional color tone and color phase in addition to the metallic luster, brightness, and background-hiding properties of the metallic pigment used in this embodiment. The color material used in this color material layer may be a dye or a pigment that is publicly known.

In this case, examples of the "pigment" contained in the color material layer include natural pigments, synthetic organic pigments, and synthetic inorganic pigments, which are defined in a general engineering field.

The color material layer may be formed by any method without particular limitation, but is preferably formed by coating. When the color material used in the color material layer is a pigment, it is preferable that the layer further contain a resin for dispersing a color material. The color material layer is preferably formed by dispersing or dissolving a pigment, a resin for dispersing a color material, and other additives according to necessary in a solvent, forming a uniform liquid film by spin-coating the dispersion or solution, and drying the film. In addition, in the production of the pigment composite raw material, it is preferred to form both the color material layer and the protection layer by coating from the standpoint of working efficiency.

The pigment composite raw material can have a layer structure composed of a plurality of laminates in which the resin layer for detachment and the metal or metal compound layer are laminated alternately. In such a case, the total thickness of the laminate structure composed of a plurality of the metal or metal compound layers, i.e., with the exception of the sheet-like base material and the resin layer for detachment disposed directly on the base material, the thickness of (metal or metal compound layer)-(resin layer for detachment)-(metal or metal compound layer) or (resin layer for detachment)-(metal or metal compound layer) is preferably 5000 nm or less. By controlling the thickness to 5000 nm or less, no cracking and detachment are caused even if the pigment composite raw material is rolled up, and thus excellent storage stability can be obtained. Furthermore, such pigment composite raw material can provide a pigment having excellent luster and background-hiding properties and is therefore preferred. In addition, the resin layers and the metal or metal compound layers may be laminated alternately on both surfaces of the sheet-like base material, but the structure of the pigment composite raw material is not limited to these structures.

The method for peeling the pigment composite from the sheet-like base material is not particularly limited. Preferably, the pigment composite raw material is immersed in a liquid, or the pigment composite raw material is immersed in a liquid and is simultaneously sonicated for conducting peeling treatment and pulverization of the peeled pigment composite at the same time.

In the metallic pigment composed of the thus prepared plate-like particles, the resin layer for detachment functions as protection colloid, and thereby a stable dispersion can be prepared by only conducting dispersion treatment in a solvent. Furthermore, when the metallic pigment is used in the metallic ink composition of this embodiment, the resin derived from the resin layer for detachment can also have a function of providing adhesiveness to a record medium.

The concentration of the metallic pigment is preferably 0.1 to 3.0% by mass, more preferably 0.25 to 2.5% by mass, and most preferably 0.5 to 2.0% by mass based on the total mass of the metallic ink composition.

(2-2) Other Components
(2-2-1) Organic Solvent

The metallic ink composition used in this step can contain an organic solvent. The organic solvent that can be used in this embodiment is preferably a polar organic solvent. Examples of the organic solvent include alcohols (for example, methanol, ethanol, propanol, butanol, isopropanol, and fluorinated alcohols), ketones (for example, acetone, methylethylketone, and cyclohexanone), carboxylic acid esters (for example, methyl acetate, ethyl acetate, propyl acetate, butyl acetate, methyl propionate, and ethyl propionate), and ethers (for example, diethyl ether, dipropyl ether, tetrahydrofuran, and dioxane). Among them, it is preferred to contain one or more alkylene glycol ethers that are liquid at ordinary temperature and pressure.

Examples of the alkylene glycol ether include ethylene glycol ether and propylene glycol ether whose basic groups are aliphatic groups such as methyl, n-propyl, isopropyl, n-butyl, isobutyl, hexyl, and 2-ethylhexyl, allyl groups having a double bond, or a phenyl group. These alkylene glycol ethers are colorless and low in odor, and since these alkylene glycol ethers have both an ether group and a hydroxyl group in the molecule, they have characteristics of both alcohol and ether, and also are liquid at ordinary temperature and pressure. Therefore, they are preferably used. In the alkylene glycol ether, there are a monoether type in which one hydroxyl group is substituted and a diether type in which both hydroxyl groups are substituted, and a combination of these ethers can be used.

It is more preferred that the metallic ink composition used in this step contain, as an organic solvent, at least one selected from mixtures of alkylene glycol monoethers, alkylene glycol diethers, and lactones.

Examples of the alkylene glycol monoethers include ethylene glycol monomethyl ether, ethylene glycol monoethyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, diethylene glycol dimethyl ether, diethylene glycol diethyl ether, triethylene glycol monomethyl ether, triethylene glycol monoethyl ether, triethylene glycol monobutyl ether, tetraethylene glycol monomethyl ether, tetraethylene glycol monoethyl ether, propylene glycol monomethyl ether, propylene glycol monoethyl ether, dipropylene glycol monomethyl ether, dipropylene glycol monoethyl ether, and dipropylene glycol monobutyl ether.

Examples of the alkylene glycol diethers include ethylene glycol dimethyl ether, ethylene glycol diethyl ether, ethylene glycol dibutyl ether, diethylene glycol dimethyl ether, diethylene glycol diethyl ether, diethylene glycol dibutyl ether, triethylene glycol dimethyl ether, triethylene glycol diethyl ether, triethylene glycol dibutyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, and dipropylene glycol diethyl ether.

Examples of the lactones include γ-butyrolactone, δ-valerolactone, and ε-caprolactone.

It is more preferred that the metallic ink composition used in this step contain, as an organic solvent, at least one selected from diethylene glycol diethyl ether and γ-butyrolactone.

(2-2-2) Resin

The metallic ink composition used in this step can contain a resin. Examples of the resin used in this embodiment include acrylic resins, styrene-acrylic resins, rosin modified resins, terpene resins, polyester resins, polyamide resins, epoxy resins, vinyl chloride resins, vinyl chloride-vinyl acetate copolymers, cellulose resins (for example, cellulose acetate butyrate and hydroxypropyl cellulose), polyvinyl butyral, polyacryl polyol, polyvinyl alcohol, and polyurethane.

In addition, non-aqueous emulsion polymer fine particles (NAD: non aqueous dispersion) can be used as a resin. The NAD is a dispersion in which fine particles of, for example, a polyurethane resin, an acrylic resin, or an acrylic polyol resin are stably dispersed in an organic solvent.

Examples of the polyurethane resin include Sanprene IB-501 and Sanprene IB-F370 manufactured by Sanyo Chemical Industires, Ltd., and examples of the acrylic polyol resins include N-2043-60MEX manufactured by Harima Chemicals, Inc.

When resin emulsion is used, its amount is preferably 0.1 to 10% by mass based on the total mass of the metallic ink composition in order to further increase the fixability of the metallic pigment to a record medium. An excessively large amount of the resin emulsion causes insufficient printing stability, and an excessively small amount causes insufficient fixability.

(2-2-3) Additive

The metallic ink composition used in this step can contain at least one selected from acetylene glycol-based surfactants and silicone-based surfactants. In this case, the amount of the surfactant is preferably 0.01 to 10% by mass based on the amount of the metallic pigment in the metallic ink composition.

With such a configuration, the wettability of the metallic ink composition to a surface to which the metallic ink composition adheres is improved, and rapid fixing can be achieved.

Examples of the acetylene glycol-based surfactants include products available from Air Products and Chemicals Inc. under trade names of Surfinol 465 (registered trademark) and Surfinol 104 (registered trademark) and products available from Nissin Chemical Industry Co., Ltd. under trade names of Olfin STG (registered trademark) and Olfin E1010 (registered trademark).

The silicone-based surfactants are preferably polyether modified silicone and polyester modified silicone, and examples of such surfactants include BYK-347, BYK-348, BYK-UV3500, BYK-UV3570, BYK-UV3510, and BYK-UV3530 (manufactured by BYK-Chemie GmbH).

The metallic ink composition may further contain an antioxidant, an ultraviolet absorber, and other additives.

Examples of the antioxidant include 2,3-butyl-4-oxyanisole (BHA) and 2,6-di-t-butyl-p-cresol (BHT). The amount of the antioxidant in the metallic ink composition is preferably 0.01 to 0.5% by mass.

Examples of the ultraviolet absorber include benzophenone compounds and benzotriazole compounds. The amount of the ultraviolet absorber in the ink composition is preferably 0.01 to 0.5% by mass.

(2-2-4) Preparation of Ink Composition Containing Metallic Pigment

The metallic ink composition used in this step can be prepared by, for example, the following process: first, mixing, for example, the metallic pigment, a dispersant, and part of the above-mentioned organic solvent with a ball mill, a bead mill, a ultrasonic mill, or a jet mill to prepare a pigment dispersion, and then adding the remaining solvent, a binder, and other additives (for example, a viscosity-controlling agent and a surfactant), according to need, to the pigment dispersion while stirring to give a metallic ink composition.

(2-2-5) Physical Properties of Ink Composition Containing Metallic Pigment

Physical properties of the metallic ink composition used in this step are not particularly limited, but the surface tension is preferably 20 to 50 mN/m, for example.

If the surface tension is lower than 20 mN/m, the metallic ink composition wets and spreads around the nozzle of an ink jet recording apparatus or soaks out of, for example, the nozzle, which makes it difficult to discharge droplets. If the surface tension is higher than 50 mN/m, the metallic ink composition cannot wet and spread on a record medium, which prevents satisfactory printing.

The viscosity at 20° C. of the metallic ink composition used in this step is preferably 2 to 10 mPa·s and more preferably 3 to 5 mPa·s. By controlling the viscosity at 20° C. of the metallic ink composition to the above-mentioned range, the metallic ink composition can be further suitably applied to an ink jet recording apparatus, and the composition in a proper amount can be discharged from the nozzle, and flight deflection and dispersion of the composition can be further decreased.

1.3.2. Step of Forming White Layer

In the step of forming a white layer in the method of forming an opaque layer according to this embodiment, droplets of an ink composition (hereinafter, occasionally referred to as "white ink composition") containing a white pigment is discharged on a record medium by the ink-jet recording process. The thickness of the white layer to be formed is preferably 0.1 to 10 μm and more preferably 1 to 5 μm. A thickness of smaller than 0.1 μm may provide insufficient whiteness to the opaque layer. A thickness of larger than 10 μm may deteriorate the flexibility of the record medium to cause cracking. In this step of forming the white layer, the second layer or the fourth layer described in the "1.1. Opaque Layer" paragraph can be formed.

(1) Ink-Jet Recording Process

This step is performed by the ink-jet recording process. Since the ink-jet recording apparatus that can be used in this step is the same as that described in the "1.3.1. Step of Forming Metal Layer" paragraph, a detailed description thereof is omitted.

In the ink-jet recording process, since a constant amount of the white ink composition can be discharged onto a record medium, a white layer with a uniform thickness can be formed. In order to form a white layer having a desired thickness, the recording may be repeated.

(2) Ink Composition Containing White Pigment

The white ink composition used in the opaque layer-forming process of this embodiment contains at least a white pigment.

(2-1) White Pigment

The white ink composition used in this step contains at least one selected from hollow resin particles and metal oxide particles as the white pigment. The hollow resin particles or the metal oxide particles may be used alone or in a combination of two or more.

(2-1-1) Hollow Resin Particles

Hollow resin particles suitable as the white pigment contained in the white ink composition used in this step may be in an emulsion form wherein the hollow resin particles are dispersed in an oil dispersing liquid. The hollow resin particles are not particularly limited and may be known ones. For example, the hollow resin particles described in U.S. Pat. No. 4,880,465 or in Japanese Patent No. 3562754 can be preferably used.

The average particle diameter (outer diameter) of the hollow resin particles is preferably 0.2 to 1.0 μm and more preferably 0.4 to 0.8 μm. When the outer diameter is larger than 1.0 μm, the dispersion stability may be insufficient due to precipitation of the particles. On the other hand, when the outer diameter is smaller than 0.2 μm, the whiteness may be insufficient. An inner diameter of about 0.1 to 0.8 μm is suitable.

The average particle diameter of the hollow resin particles can be measured with a particle size distribution analyzer employing laser diffraction scattering as the measurement principle. As the laser diffraction particle size distribution analyzer, for example, a particle size distribution analyzer (for example, "Microtrac UPA" manufactured by Nikkiso Co., Ltd.) employing dynamic light scattering as the measurement principle can be used.

In the white ink composition used in this step, when the white pigment is the hollow resin particles, the amount (solid content) of the hollow resin particles is preferably 0.5 to 25% by mass and more preferably 5 to 20% by mass based on the total mass of the white ink composition. When the amount (solid content) of the hollow resin particles is higher than 25% by mass, clogging of the ink-jet recording head may be caused to decrease the reliability. On the other hand, when the amount (solid content) is lower than 0.5% by mass, the degree of whiteness may be insufficient.

The hollow resin particles may be prepared by any method without particular limitation, and known methods, for example, the methods described in U.S. Pat. Nos. 4,880,465, 5,229,209, 4,594,363, 4,427,836, and 4,089,800, and JP-A-2003-313481, can be used. In addition, various hollow particles are commercially available. Furthermore, methods for preparing the hollow resin particles and methods for designing the hollow size or the outer diameter are also known and disclosed in, for example, the above-mentioned patents or patent application. The hollow resin particles can be prepared by, for example, so-called emulsion polymerization in which emulsion of hollow resin particles is formed by stirring a vinyl monomer, a surfactant, a polymerization initiator, and an aqueous dispersion medium in a nitrogen atmosphere while heating.

Examples of the vinyl monomer include nonionic monoethylene unsaturated monomers such as styrene, vinyl toluene, ethylene, vinyl acetate, vinyl chloride, vinylidene chloride, acrylonitrile, (meth)acrylamide, and (meth)acrylic acid ester. Examples of the (meth)acrylic acid ester include methyl acrylate, methyl (meth)acrylate, ethyl (meth)acrylate, butyl (meth)acrylate, 2-hydroxyethyl (meth)acrylate, 2-ethylhexyl (meth)acrylate, benzyl (meth)acrylate, lauryl (meth)acrylate, oleyl (meth)acrylate, palmityl (meth)acrylate, and stearyl (meth)acrylate.

In addition, the vinyl monomer may be a bifunctional vinyl monomer. Examples of the bifunctional vinyl monomer include divinyl benzene, allyl methacrylate, ethylene glycol dimethacrylate, 1,3-butane-diol dimethacrylate, diethylene glycol dimethacrylate, and trimethylolpropane trimethacrylate. Hollow resin particles having not only light scattering properties but also properties such as heat resistance, solvent resistance, and dispersibility in solvent can be prepared by copolymerizing the above-mentioned monofunctional vinyl monomer and the bifunctional vinyl monomer to form high cross-linking.

Any surfactant that can form molecule assembly in water, such as micelle, can be used, and examples of the surfactant include anionic surfactants, nonionic surfactants, cationic surfactants, and ampholytic surfactants.

Any known polymerization initiator that is soluble in water can be used, and examples of the polymerization initiator include hydrogen peroxide and potassium persulfate.

Examples of the aqueous dispersion medium include water and water containing a hydrophilic organic solvent.

The hollow resin emulsion that can be used in this embodiment can be prepared as a dispersion system in which the hollow resin particles are dispersed in an organic solvent. The organic solvent is preferably a polar organic solvent, and examples of the polar organic solvent include alcohols (for example, methanol, ethanol, propanol, butanol, isopropanol, or fluorinated alcohols), ketones (for example, acetone, methylethylketone, or cyclohexanone), carboxylic acid esters (for example, methyl acetate, ethyl acetate, propyl acetate, butyl acetate, methyl propionate, or ethyl propionate), and ethers (for example, diethyl ether, dipropyl ether, tetrahydrofuran, or dioxane).

More preferred organic solvents are mixtures of a diethylene glycol compound that is liquid at ordinary temperature and pressure and a dipropylene glycol compound that is liquid at ordinary temperature and pressure, such as those described in Japanese Domestic Re-publication of PCT International Publication No. WO2002-055619. Specifically, a combination of diethylene glycol diethyl ether and dipropylene glycol monoethyl ether can be used. Furthermore, other examples include triethylene glycol monomethyl ether, triethylene glycol dimethyl ether, triethylene glycol monobutyl ether, tetraethylene dimethyl ether, and tetraethylene monobutyl ether.

(2-1-2) Metal Oxide Particles

The metal oxide particles suitable as the white pigment contained in the white ink composition used in this step are, for example, titanium dioxide and zinc oxide (zinc white). The metal oxide particles are inferior to the hollow resin particles in tinting strength, transparency, and sharpness, but are superior to the hollow resin particles in light resistance.

The average particle diameter of the metal oxide particles is preferably 0.02 to 1 μm and more preferably 0.05 to 0.8 μm. When the average particle diameter of the metal oxide particles is larger than 1 μm, the metal oxide particles, which have a large specific gravity, may precipitate to decrease the dispersion stability. On the other hand, when the average particle diameter of the metal oxide particles is smaller than 0.02 μm, the degree of whiteness may be insufficient.

In the white ink composition, when the white pigment is the metal oxide particles, the amount of the metal oxide particles is preferably 5 to 20% by mass and more preferably 5 to 15% by mass based on the total mass of the white ink composition. When the amount of the metal oxide particles is higher than 20% by mass, clogging of the ink-jet recording head may occur to decrease the reliability. On the other hand, when the amount of the metal oxide particles is lower than 5% by mass, the light scattering property is low and the shielding property may be insufficient.

(2-1-3) Other Components

The white ink composition used in this step can contain, as an organic solvent, at least one selected from alkylene glycol ethers and lactones that are liquid at ordinary temperature and pressure, and preferred are alkylene glycol ethers. Examples of alkylene glycol ethers and lactones are the same compounds and products as those that can be used in the above-mentioned metallic ink composition.

The white ink composition used in this step can contain a resin or a non-aqueous resin emulsion. The resin or the non-aqueous resin emulsion may the same compounds and products as those that can be used in the metallic ink composition.

The white ink composition according to this embodiment can contain at least one selected from silicone-based surfactants and acetylene glycol-based surfactants, in addition to the white pigment, the organic solvent, and the resin. The silicone-based surfactants and acetylene glycol-based surfactants may be the same compounds and products as those that can be used in the metallic ink composition.

The white ink composition used in this step can contain a dispersant. The dispersant may be a usual dispersant that is used in ordinary oil-based ink compositions, in particular, in oil-based ink compositions for ink-jet recording. The dispersant is preferably those that effectively work when the solubility parameter of the organic solvent is 8 to 11. The dispersant may be commercially available ones such as polyester polymers, for example, Hinoact KF1-M, T-6000, T-7000, T-8000, T-8350P, and T-8000E (manufactured by Takefu Fine Chemical Co., Ltd.), solsperse 20000, 24000, 32000, 32500, 33500, 34000, and 35200 (manufactured by Avecia), disper-byk-161, 162, 163, 164, 166, 180, 190, 191, and 192 (manufactured by BYK-Chemie GmbH), FLOWLEN DOPA-17, 22, 33, and G-700 (manufactured by Kyoeisha Chemical Co., Ltd.), AJISPER PB821 and PB711 (manufactured by Ajinomoto-Fine-Techno Co., Inc.), LP4010, LP4050, LP4055, POLYMER 400, 401, 402, 403, 450, 451, and 453 (manufactured by EFKA chemicals B.V.).

The amount of the dispersant is suitably determined depending on the white pigment to be dispersed, and is preferably 5 to 200 parts by mass and more preferably 30 to 120 parts by mass based on 100 parts by mass of the white pigment in the white ink composition.

The white ink composition used in this step can further contain other additives that are contained in ordinary oil-based ink compositions, in addition to the above-mentioned additives. Such additives are, for example, a stabilizer (for example, an antioxidant or an ultraviolet absorber). Examples of the antioxidant include BHA (2,3-butyl-4-oxyanisole) and BHT (2,6-di-t-butyl-p-cresol). Examples of the ultraviolet absorber include benzophenone compounds and benzotriazole compounds.

The white ink composition used in this step can further contain a binder resin, which can control the viscosity of the white ink composition. The viscosity (at 20° C.) of the white ink composition according to this embodiment is, for example, preferably 10 mPa·s and more preferably 5 mPa·s. Examples of the binder resin include acrylic resins, styrene-acrylic resins, rosin modified resins, phenol resins, terpene resins, polyester resins, polyamide resins, epoxy resins, vinyl chloride-vinyl acetate copolymers, cellulose resins (for example, cellulose acetate butyrate), and vinyl toluene-α-methyl styrene copolymers. Furthermore, the fixability of a color material to a record medium can be increased by controlling the amount of the binder resin.

(2-1-4) Process of Preparing Ink Composition Containing White Pigment

The white ink composition used in this step can be prepared as in common pigment inks by using a known apparatus such as a ball mill, a sand mill, an attritor, a basket mill, or a roll mill. In the preparation, coarse particles are preferably removed with a membrane filter or a mesh filter.

1.3.3. Relative Relationship Between Metal Layer and White Layer

In this embodiment, an opaque layer is formed by the above-mentioned steps. The configuration of the opaque layer is as described in the "1.1. Opaque Layer" paragraph, and the steps of forming the metal layer and of forming the white layer are performed such that at least part of the metal layer and part of the white layer overlap each other. By doing so, an opaque layer is formed on the record medium on the side where the metal layer and the white layer are formed in a region where the both layers overlap each other.

In the opaque layer of this embodiment, it is further preferred that the mass ratio of the metallic pigment in the metallic ink composition and the white pigment in the white ink composition be 1:3 to 3:1. When the ratio deviates from this range, the background-hiding property of the opaque layer and the degree of whiteness may be insufficient. The mass ratio of the pigments in the opaque layer can be changed by changing the concentration of the pigment in each ink composition, changing the thicknesses of the metal layer and the white layer, and/or changing the number of the layers.

In the printing field, it is common that the opaque layer is made of only a white layer. Thus, a technique in which an opaque layer is formed of a combination of a metallic ink composition and a white ink composition by an ink-jet system is not known. In the method of forming an opaque layer according to this embodiment, not only the background of an image is hidden, but also since the light passing through the white layer is reflected by the metallic pigment layer and passes through the white layer again and scattered, the degree of whiteness of the white layer can be significantly increased.

An opaque layer having any of the configurations described in the "1.1. Opaque Layer" paragraph is prepared by performing the step of forming the metal layer and the step of forming the white layer. In addition, when one of the metal layer and the white layer is formed as an undercoat layer of the other layer, the step of forming the other layer may be performed after drying of the undercoat layer. That is, these steps may include a drying step.

As described above, in the method of forming an opaque layer according to this embodiment, an opaque layer hardly allowing the background being seen and having a satisfactory degree of whiteness can be formed on a record medium.

1.4. Recording Process

In the recording process according to this embodiment, an image is recorded on the opaque layer formed by the above-described method by, for example, printing. In the recording process of this embodiment, the record medium on which the opaque layer is formed by the above-described method is handled as a new record medium, and the recording process includes a step of recording an image at least on the opaque layer. The process of recording an image is not particularly limited, but since the opaque layer is formed by the ink-jet recording method as described above, it is efficient to perform the recording process by the ink-jet recording method from the standpoint of simplicity of the step. Since the ink-jet recording method is the same as that described in the "1.3.1 Step of Forming Metal Layer" paragraph, a detailed description thereof is omitted.

1.5. Recorded Matter

The record medium having the opaque layer formed by the method of forming an opaque layer of this embodiment is a recorded matter in which an opaque layer is formed on a record medium. In this recorded matter, since the opaque layer can hide the background, for example, an image can be formed by the opaque layer. In this case, since the opaque layer has an excellent background-hiding property, an image having a higher sharpness can be recorded.

In the recorded matter in which an image is recorded by the recording process of this embodiment (refer to "1.4. Recording Process"), since the image is recorded on the white opaque layer that can hide the background, the background is not seen through the image, and the image can have high quality.

1.6. Ink Set

The ink set according to this embodiment is a set of ink compositions including at least one kind of the above-described metallic ink composition and at least one kind of the above-described white ink composition.

The metallic ink compositions and the white ink compositions may be respectively included alone or two or more in the ink set. Furthermore, the ink set may include one or more other ink compositions. Examples of such additional ink compositions include color ink compositions such as cyan, magenta, yellow, light cyan, light magenta, dark yellow, red, green, blue, orange, and violet; colorless or light clear ink compositions; black ink compositions; and light black ink compositions.

1.7. Ink Cartridge and Recording Apparatus

The ink cartridge according to this embodiment includes the ink set described in the "1.6. Ink Set" paragraph. By this ink cartridge, the ink set can be readily transported. The ink cartridge of this embodiment can be used for, for example, ink-jet recording apparatuses, general writing materials, recorders, and pen plotters. In particular, the ink cartridge according to this embodiment can be preferably used in the ink-jet recording apparatuses. The ink-jet recording apparatus according to this embodiment includes the ink cartridge.

2. Second Embodiment 2.1. Opaque Layer and Record Medium

The opaque layer formed by the method for forming an opaque layer according to this embodiment is made of an opaque ink composition that is a mixture of an ink composition (metallic ink composition) containing a metallic pigment and an ink composition (white ink composition) containing a white pigment, and can provide a white surface that hides the background.

The record medium that is provided with the opaque layer according to this embodiment is not particularly limited and can be suitably selected in the view of the use of a recorded matter. The record media described in "1. First embodiment" can be used according to the purpose.

2.2. Method of Forming Opaque Layer

The method of forming an opaque layer according to this embodiment includes a mixing step and an opaque layer-forming step.

2.2.1. Mixing Step

In the mixing step, an opaque ink composition is prepared by mixing an ink composition containing a metallic pigment and an ink composition containing a white pigment. For example, in the mixing step, the metallic ink composition and the white ink composition are prepared in advance, and then an opaque ink composition is prepared by mixing these compositions, or the metallic ink composition and the white ink composition are prepared in advance, and then these compositions are introduced to an ink-jet recording apparatus and mixed with a two-liquid mixing unit of the ink-jet recording apparatus.

Since the metallic ink composition and the white ink composition used in this embodiment are the same as those described in "1. First Embodiment", a detailed description is omitted.

In the opaque ink composition prepared in the mixing step, the concentration of the metallic pigment (solid content) is preferably 0.1 to 3.0% by mass, more preferably 0.25 to 2.5% by mass, and most preferably 0.5 to 2.0% by mass based on the total mass of the opaque ink composition. When the amount of the metallic pigment is higher than 3% by mass, the degree of whiteness of the opaque layer may be insufficient. On the other, when the amount of the metallic pigment is lower than 0.1% by mass, the shielding property may be low to give an insufficient hiding property.

In the opaque ink composition prepared in the mixing step, when the white pigment is hollow resin particles, the amount of the hollow resin particles (solid content) is preferably 0.5 to 25% by mass and more preferably 5 to 20% by mass based on the total mass of the opaque ink composition. When the amount (solid content) of the hollow resin particles is higher than 25% by mass, clogging of the ink-jet recording head may occur to decrease the reliability. On the other hand, when the amount (solid content) is lower than 0.5% by mass, the degree of whiteness of the opaque layer may be insufficient.

In the opaque ink composition prepared in the mixing step, when the white pigment is metal oxide particles, the amount of the metal oxide particles is preferably 5 to 20% by mass and more preferably 5 to 15% by mass based on the total mass of the opaque ink composition. When the amount of the metal oxide particles is higher than 20% by mass, clogging of the ink-jet recording head may occur to decrease the reliability. On the other hand, when the amount of the metal oxide particles is lower than 5% by mass, the light scattering property may be low to give an insufficient hiding property.

The mixing ratio of the metallic ink composition and the white ink composition can be properly adjusted such that the amounts of the metallic pigment and the white pigment are within the above-mentioned ranges.

Among the above-described methods for mixing the metallic ink composition and the white ink composition in the mixing step, the method using the two-liquid mixing unit can be performed using an ink-jet recording apparatus described below. The ink-jet recording apparatus has a two-liquid mixing unit that can mix two kinds of inks. The two-liquid mixing unit is not particularly limited as long as it can completely mix two kinds of inks. The two-liquid mixing unit includes, for example, a pump portion composed of a first actuator for ejecting a first liquid and a second actuator for ejecting a second liquid; and a mixer portion composed of a first mixing chamber where the first liquid and the second liquid ejected from the pump portion are joined together and mixed, a diversion chamber where the liquids ejected by the pump portion and mixed in the first mixing chamber are divided into two or more fractions by passing through the chamber, and a second mixing chamber where the liquids that passed through the diversion chamber are joined together again and further mixed. The ejection efficiencies of the pumps can be changed independently from each other by independently controlling the frequencies of driving signals applied to the first actuator and the second actuator of the pump portion. By doing so, the mixing ratio of the two kinds of liquids sent in the unit can be properly adjusted.

2.2.2. Step of Forming Opaque Layer

The step of forming an opaque layer is performed after the mixing step by discharging droplets of the opaque ink composition to the upside of a record medium by the ink-jet recording process.

This step can be performed by using the same ink-jet recording apparatus as that described in "1. First Embodiment". Furthermore, this step can be also performed by using the above-described ink-jet recording apparatus having a two-liquid mixing unit.

In this step, an opaque layer is formed by discharging the opaque ink composition prepared in the mixing step on the record medium for adhesion using such an ink-jet recording apparatus.

Since this step is performed by using the ink-jet recording apparatus, a constant amount of the opaque ink composition can be discharged on the record medium. Accordingly, the opaque layer can have a uniform thickness. Furthermore, the step may be repeated a plurality of times in order to obtain a desired thickness of the opaque layer.

The thickness of the opaque layer of this embodiment is preferably 0.5 to 20 μm and more preferably 2.0 to 10 μm. A thickness of smaller than 0.5 μm may provide insufficient background-hiding effect. A thickness of larger than 20 μm may deteriorate the flexibility of the record medium to cause cracking. The mass ratio of the metallic pigment in the metallic ink composition and the white pigment in the white ink composition contained in the opaque layer of this embodiment is preferably 1:3 to 3:1. If the ratio deviates from this range, the background-hiding property of the opaque layer and the degree of whiteness may be insufficient. The mass ratio of the pigments in the opaque layer can be changed by changing the concentration of the pigment contained in each ink.

The $L^*$ value of the opaque layer prepared in the steps described above is preferably 55 or more, more preferably 57 or more, and most preferably 60 or more. An $L^*$ value of less than 55 causes insufficient whiteness of the opaque layer and therefore is undesirable.

As described above, according to the method of forming an opaque layer according to this embodiment, an opaque layer hardly allowing the background being seen and having a satisfactory degree of whiteness can be formed.

2.3. Non-Aqueous Opaque Ink Composition

The opaque ink composition used in this embodiment can be a non-aqueous system that does not contain water. The non-aqueous opaque ink composition can be prepared by mixing a metallic ink composition not containing water and a white ink composition not containing water. The non-aqueous opaque ink composition also can be prepared by sufficiently stirring and mixing an organic solvent, a surfactant, and other additives; adding a metallic pigment dispersion and a white pigment dispersion prepared in advance to the above mixture; and stirring and mixing the resulting mixture.

The non-aqueous opaque ink composition contains at least a metallic pigment, a white pigment, and an organic solvent. Since the metallic pigment, the white pigment, and the organic solvent are the same as those described in "1. First embodiment", a description thereof is omitted.

2.4. Recording Process

In the recording process according to this embodiment, an image is recorded on the opaque layer formed by the method of forming an opaque layer of this embodiment by, for example, printing. In the recording process of this embodiment, the record medium having the opaque layer formed by the above-described method is handled as a new record medium, and at least a step of recording an image on the opaque layer is included.

2.5. Recorded Matter

The record medium provided with the opaque layer by the method of forming an opaque layer of this embodiment is a recorded matter where the opaque layer is formed on the record medium. In this recorded matter, since the opaque layer can hide the background, for example, an image can be formed by the opaque layer. In this case, since the opaque layer has an excellent background-hiding property, an image having a higher sharpness can be recorded.

In the recorded matter where an image is formed by the recording process of this embodiment (refer to "2.4. Recording Process"), since the image is recorded on the white opaque layer that can hide the background, the background is not seen through the image, and the recorded image can have high quality.

2.6. Ink Set

The ink set according to this embodiment is a set of ink compositions including at least the above-described opaque ink composition.

The metallic ink compositions and the white ink compositions may be respectively included alone or two or more in the ink set. Furthermore, the ink set may include one or more other ink compositions. Examples of such additional ink compositions include color ink compositions such as cyan, magenta, yellow, light cyan, light magenta, dark yellow, red, green, blue, orange, and violet; colorless or light clear ink compositions; black ink compositions; light black ink compositions; metallic ink compositions; and white ink compositions.

2.7. Ink Cartridge and Recording Apparatus

The ink cartridge according to this embodiment includes the ink set described in "2.6. Ink Set". By this ink cartridge, the ink set can be readily transported. The ink cartridge of this embodiment can be used for, for example, ink-jet recording apparatuses, general writing materials, recorders, and pen plotters. In particular, the ink cartridge according to this embodiment can be preferably used in the ink-jet recording apparatuses. The ink-jet recording apparatus according to this embodiment includes the ink cartridge.

3. Examples and Comparative Examples

The invention will be described in detail by Examples and Comparative Examples below, but the invention is not limited thereto.

3.1. Preparation of Metallic Ink Composition
3.1.1. Preparation of Metallic Pigment Dispersion First, a resin thin-film layer was formed on a PET film with a thickness of 100 μm by uniformly applying a resin layer application liquid consisting of 3.0% by mass of cellulose acetate butyrate (Kanto Chemical Co., Ltd.) and 97% by mass of diethylene glycol diethyl ether (Nippon Nyukazai Co., Ltd.) on the PET film by bar coating and drying the resulting coat at 60° C. for 10 minutes.

Then, an aluminum deposition layer having an average thickness of 20 nm was formed on the resin layer using a vacuum deposition apparatus (vacuum deposition device model VE-1010 manufactured by Vacuum Device Co.).

Then, the laminate thus formed in the above process was subjected to treatment for peeling, pulverization, and dispersion at the same time in diethylene glycol diethyl ether using a ultrasonic disperser (VS-150 manufactured by As One Corp.) for 12 hours in total to give a metallic pigment dispersion.

The resulting metallic pigment dispersion was filtered using an SUS mesh filter with 5 μm openings to remove coarse particles. Then, the filtrate was poured into a round-bottomed flask and the diethylene glycol diethyl ether was evaporated using a rotary evaporator. Thereby, the metallic pigment dispersion was concentrated. Then, the concentration of the metallic pigment dispersion was adjusted to give a 5% by mass of metallic pigment dispersion.

Particle size distribution and 50% volume average particle diameter of the metallic pigment were measured with a laser particle size distribution analyzer ("LMS-30" manufactured by Seishin Enterprise Co., Ltd.). The 50% average particle diameter was 1.03 μm, and the maximum particle diameter was 4.9 μm.

The 506 average particle diameter R50 based on circle-equivalent diameters of the major axis (X direction)—the minor axis (Y direction) flat surface of the metallic pigment and the average thickness Z were measured with a particle diameter/particle size distribution analyzer (FPIA-3000S manufactured by Sysmex Corp.). Furthermore, R50/Z was calculated based on the resulting R50 and Z values. The average particle diameter Rmax was 3.2 μm, the 50% average particle diameter R50 was 0.89 μm, the average thickness Z was 0.02 μm, and R50/Z was 44.5. The particle size distribution value (CV value) was calculated by the equation: CV value=(standard deviation of particle size distribution)/(average particle diameter)×100. The particle size distribution (CV value) was 38.2.

Randomly selected ten metallic pigment particles were observed with an electron microscope and were measured for thicknesses. The average thickness was 20 nm.

3.1.2. Preparation of Metallic Ink Composition

Metallic ink compositions having compositions shown in Table 1 were prepared using the above-prepared metallic pigment dispersion. First, each ink solvent was prepared by dissolving additives in a solvent by mixing, and the metallic pigment dispersion was added to the ink solvent. The mixture was stirred for mixing with a magnetic stirrer at ordinary temperature and pressure for 30 minutes. The resulting ink compositions were each filtered using a stainless steel mesh filter of 10 μm pore size to give metallic ink compositions 1 and 2.

TABLE 1

| | Metallic ink composition | |
|---|---|---|
| Component | 1 | 2 |
| DEGDE | 47.8 | 61.3 |
| DPGMB | 45.0 | — |
| GBL | — | 15.0 |
| TEGDM | — | 18.0 |
| N-2043-60-MEX | 6.0 | 4.0 |
| BYK-UV3500 | 0.2 | 0.2 |
| Metallic pigment solid content | 1.0 | 1.5 |

In Table 1, diethylene glycol diethyl ether (DEGDE), dipropylene glycol monobutyl ether (DPGMB), and tetraethylene glycol dimethyl ether (TEGDM) were those manufactured by Nippon Nyukazai Co., Ltd; γ-butyrolactone (GBL) was that manufactured by Kanto Chemical Co., Ltd; N-2043-60-MEX (resin emulsion) was that manufactured by Harima Chemicals, Inc.; and BYK-UV3500 (surfactant) was that manufactured by BYK-Chemie Japan. The unit was "1 by mass".

3.2. Preparation of White Ink Composition
3.2.1. Preparation of Polymer Particles One hundred parts by mass of styrene, 1 part by mass of α-methylstyrene dimer, 14 parts by mass of t-dodecyl mercaptan, 0.8 part by mass of sodium dodecylbenzenesulfonate, 1.0 part by mass of potassium persulfate, and 200 parts by mass of water were put in a 2-L reaction vessel and were stirred under nitrogen gas at 80° C. for 6 hours for emulsion polymerization. The resulting polymer particles had an average particle diameter of 250 nm.

3.2.2. Preparation of Hollow Resin Emulsion

Ten parts by mass (in terms of solid content) of the polymer particles prepared in the above manner, 0.3 part by mass of sodium lauryl sulfate, 0.5 part by mass of potassium persulfate, and 400 parts by mass of water were put in a reaction vessel. Further added thereto was a cross-linking polymerizable monomer composition composed of 11.6 parts by mass of divinylbenzene (purity: 55% by mass, remainder: monofunctional vinyl monomer), 8.4 parts by mass of ethylvinyl benzene, 5 parts by mass of methacrylic acid, and 75 parts by mass of methyl methacrylate. The resulting mixture was stirred at 30° C. for 1 hour and then at 70° C. for 5 hours for emulsion polymerization to give an aqueous dispersion. The particle diameter of the resulting polymer measured with a particle size analyzer (Microtrac UPA manufactured by Nikkiso Co., Ltd.) was 520 nm, and observation with a transmission electron microscope confirmed that the polymer was hollow resin fine particles. The thus prepared emulsion was used as a hollow resin emulsion.

3.2.3. Preparation of DEGDE Dispersion of Hollow Resin Emulsion

The thus prepared hollow resin emulsion was subjected to centrifugation for removing water and then dried under a reduced pressure at 40° C. for 3 days for further removing water. The resulting hollow resin emulsion was weighed in a round-bottomed flask, and DEGDE was added to the flask so that the solid concentration was 20% by mass. The resulting mixture was stirred with a magnetic stirrer for 24 hours. Subsequently, the round-bottomed flask containing the DEGDE dispersion of the hollow resin emulsion was set in an ultrasonic washing tank, and the air in the hollow resin emulsion was completely substituted by DEGDE by deaeration with an aspirator under a reduced pressure for 8 hours while performing ultrasonic dispersion. The resulting dispersion was used as a DEGDE dispersion of the hollow resin emulsion.

3.2.4. Preparation of Titanium Dioxide Fine Particles

A titanium sulfate solution was prepared by dissolving titanium-containing ore in sulfuric acid. This titanium sulfate solution was hydrolyzed to give aqueous titanium oxide, and added to 100 parts by mass (in terms of $TiO_2$) of this aqueous titanium oxide were 0.50 parts by mass of ammonium phosphate, 0.30 parts by mass of potassium sulfate, and 0.30 parts by mass of aluminum sulfate. The resulting mixture was heated in a laboratory rotary muffle furnace until the product temperature reached 1020° C. The resulting titanium dioxide fine particles were allowed to cool to room temperature and were observed on a transmission electron microscopic photograph that the particles were an anatase type and had an average primary particle diameter of 0.13 μm.

3.2.5. Preparation of Monomer Dispersion of Titanium Dioxide Fine Particles

Fifteen parts by mass of titanium dioxide fine particles as a surface-treated white pigment, 5 parts by mass of polyoxyalkylene-added polyalkyleneamine (Discoal N-518 manufactured by Dai-ichi Kogyo Seiyaku Co., Ltd.), and 80 parts by mass of diethylene glycol diethyl ether were mixed to give a slurry. The resulting slurry and zirconium beads (1.0 mm diameter) in an amount of 1.5 times the mass of the slurry were charged to a sand mill (manufactured by Yasukawa Seisakusyo) and were subjected to dispersion treatment for 2 hours. The beads were removed to give a monomer dispersion containing 60% by mass of the titanium dioxide fine particles.

3.2.6. Preparation of White Ink Composition

White ink compositions 1 and 3 having the compositions shown in Table 2 were prepared using the DEGDE dispersion of the hollow resin emulsion prepared in the above. That is, DPGMB and a surfactant were weighed in each vessel and were sufficiently mixed by stirring using a magnetic stirrer for 30 minutes. A resin emulsion N-2043-60-MEX was added to the resulting mixture, followed by further stirring for 30 minutes for sufficiently mixing them. Then, the DEGDE dispersion of the hollow resin emulsion was added thereto, followed by stirring/mixing for further 1 hour. The resulting product was filtered using a PTFE membrane filter with a 10 μm pore size to give white ink compositions 1 and 3.

White ink composition 2 having the composition shown in Table 2 was prepared using the monomer dispersion containing 60% by mass of the titanium dioxide fine particles prepared in the above. That is, diethylene glycol diethyl ether, γ-butyrolactone, tetraethylene glycol dimethyl ether, and polyoxyalkylene-added polyalkyleneamine (surfactant: Discoal N-518 manufactured by Dai-ichi Kogyo Seiyaku Co., Ltd.) were weighed in a vessel and were sufficiently mixed by stirring them with a magnetic stirrer for 30 minutes. The monomer dispersion was added to the resulting mixture, followed by further stirring/mixing for 1 hour. The resulting product was filtered using a PTFE membrane filter with a 10 μm pore size to give white ink composition 2. In Table 2, the unit is "% by mass".

TABLE 2

| Component | White ink composition 1 | White ink composition 2 | White ink composition 3 |
| --- | --- | --- | --- |
| DPGMB | 52.8 | 60.0 | 60.0 |
| GBL | 15.0 | 12.0 | 11.0 |
| TEGDM | 18.0 | 11.8 | 10.8 |
| N-2043-60-MEX | 4.0 | — | 3.0 |
| BYK-UV3500 | 0.2 | 0.2 | 0.2 |
| N-518 | — | 4.0 | — |
| White pigment solid content | 10.0 | 12.0 | 15.0 |

3.2.7. Opaque Ink Composition

Equal amounts (mass ratio: 1:1) of the metallic ink composition 2 and the white ink composition 3 were mixed to prepare an opaque ink composition. This opaque ink composition is a non-aqueous system.

3.3. Evaluation of Degree of Whiteness and Hiding Property

Samples of Examples and Comparative Examples were prepared as follows:

3.3.1. Record Medium

The record media used were transparent media, "SP2 (transparent PET film manufactured by Kimoto Co., Ltd.)" and "SOLN-100 (with adhesive) (transparent PET film manufactured by VIGteQnos Co., Ltd.)", and a black opaque medium, "ViewCal VC901 (black vinyl chloride sheet manufactured by Sakurai Co., Ltd.), and were cut into A4 size. The record media used in each Example and each Comparative Example are shown in Tables 3 to 6.

3.3.2. Preparation of Samples for Evaluation

Each sample was prepared using an ink-jet printer SP-300V (manufactured by Roland DG Corp.) as the ink-jet recording apparatus. Samples of Examples excluding Examples 7, 16, and 26, i.e., samples of Examples 1 to 6, 8 to 15, and 17 to 25 and Comparative Examples 1 to 7 were prepared using the metallic ink compositions shown in Tables 3 to 6 instead of the cyan ink of the printer and the white ink compositions shown in Tables 3 to 6 instead of the yellow ink of the printer by charging them to the printer. The magenta ink and the black ink of the printer were used without replacement.

The metal layers of all samples were formed on a medium "vinyl chloride General 1" using the metal ink compositions as uniform solid images at a heating temperature of 40° C. at a printing mode of printing quality "high". The white layers of all samples were also formed as uniform solid images under the same printing conditions as those of the metal layers. The amount of ink used for each of the metal layers and the white layers was 1.6 mg/cm$^2$ per single printing.

In the samples of Examples 1 to 6, 13 to 15, and 17 to 25 and Comparative Examples 1, 2, and 4 to 7, first, metal layers in the numbers shown in each Table were formed on the record media shown in each Table. In these samples, the metal layers were formed directly on the recording surfaces of the record media. Subsequently, white layers in the numbers shown in each Table were formed on the resulting metal layers.

The samples of Examples 8 to 11 and Comparative Example 3 were prepared by printing a solid image once on the recording surface of each record medium using a magenta ink, then forming metal layers in the number shown in the Table, and, subsequently, forming a single white layer on the metal layer of each sample.

The sample of Example 12 was prepared by printing a solid image once on the recording surface of a record medium using a magenta ink, then forming two white layers thereon, and then forming a metal layer. Subsequently, a white layer was formed on the metal layer.

The samples of Examples 7, 16, and 26 were prepared by forming a single opaque layer as a uniform solid image on each record medium shown in each Table using the above-mentioned ink-jet recording apparatus under the same conditions except that an opaque ink composition was charged to the printer instead of the magenta ink of the printer and other inks were used without replacement.

The samples of Comparative Examples 8 to 13 were prepared by printing by simultaneously discharging the metallic ink composition 2 and the white ink composition 3 toward each record medium shown in Table 7.

In Comparative Example 8, the printing by simultaneously attaching the white pigment ink composition and the metallic pigment ink composition at a mass ratio of 1:1 to the record medium was performed once.

In Comparative Example 9, the printing by simultaneously attaching the white pigment ink composition and the metallic pigment ink composition at a mass ratio of 1:1 to the record medium was performed twice.

In Comparative Example 10, the printing by simultaneously attaching the white pigment ink composition and the metallic pigment ink composition at a mass ratio of 1:2 to the record medium was performed once.

In Comparative Example 11, the printing by simultaneously attaching the white pigment ink composition and the metallic pigment ink composition at a mass ratio of 1:2 to the record medium was performed twice.

In Comparative Example 12, the printing by simultaneously attaching the white pigment ink composition and the metallic pigment ink composition at a mass ratio of 2:1 to the record medium was performed once.

In Comparative Example 13, the printing by simultaneously attaching the white pigment ink composition and the metallic pigment ink composition at a mass ratio of 2:1 to the record medium was performed twice.

All of the thus prepared samples were dried at ordinary temperature for 8 hours and then used for evaluation.

3.3.3 Measurement of Degree of Whiteness

Degrees of whiteness were determined by measuring $L^*$ values. The $L^*$ values were measured with a spectrophotometer (SPM-50 manufactured by Gretag Macbeth Co., Ltd.).

3.3.4. Measurement of Hiding Property

The samples printed on transparent record media (SP2 and SOLN-100) can be measured for $L^*$ values by changing the backward environment. That is, $L^*$ values of a sample can be measured in both states that the sample is placed on a white medium (Super Fine specialty paper manufactured by Seiko Epson Corp.) having an $L^*$ value of 93.6 and placed on a black medium (ViewCal VC901 manufactured by Sakurai Co., Ltd.) having an OD value of 2.29.

By comparing the $L^*$ values on the black medium and the white medium, the hiding property can be evaluated. That is, a difference ($\Delta L^*$) between the $L^*$ value of a sample on the black medium and the $L^*$ value of the sample on the white medium shows the degree of influence of the background that is seen through an opaque layer. A smaller $\Delta L^*$ means lower influence of the background and therefore means an excellent background-hiding property of the opaque layer. The $\Delta L^*$ is given by the following equation:

$$\Delta L^* = (L^* \text{value of sample placed on white medium}) - (L^* \text{value of sample placed on black medium}).$$

Since the samples in Examples 8 to 21 and Comparative Example 3 had magenta solid images in the background, OD values of magenta color were also measured. The OD values were measured with a spectrophotometer (SPM-50 manufactured by Gretag Macbeth Co., Ltd.).

3.4. Evaluation Results

Table 3 shows the results when the record media were a transparent medium "SP2 (manufactured by Kimoto Co., Ltd.)".

TABLE 3

|  | Example | | | | | | | Comparative Example | |
| --- | --- | --- | --- | --- | --- | --- | --- | --- | --- |
| Record medium: SP2 | 1 | 2 | 3 | 4 | 5 | 6 | 7 | 1 | 2 |
| Type of metallic ink composition | 1 | 1 | 1 | 2 | 2 | 2 | 2 | — | — |
| Number of metal layer | 1 | 2 | 3 | 1 | 2 | 3 | — | 0 | 0 |
| Type of white ink composition | 1 | 1 | 1 | 2 | 2 | 2 | 3 | 1 | 1 |
| Number of white layer | 1 | 1 | 1 | 1 | 1 | 1 | — | 1 | 1 |
| $L^*$ value, base layer: white ($L^*$ = 93.6) | 72.7 | 81.6 | 81.0 | 66.7 | 75.6 | 75.2 | — | 91.3 | 85.2 |
| $L^*$ value, base layer: black ($L^*$ = 4.6) | 71.2 | 81.1 | 81.0 | 65.5 | 75.5 | 75.1 | 57.3 | 49.8 | 43.5 |
| $\Delta L^*$ | 1.5 | 0.5 | 0.0 | 1.2 | 0.1 | 0.1 | — | 41.5 | 41.7 |

As shown in Table 3, it was revealed that the $L^*$ values measured by placing a black medium ($L^*$=4.6) on the background were 57.3 or more in all samples of Examples 1 to 7 and that the samples thus had excellent whiteness. In this evaluation, since the degrees of whiteness were measured by placing the black medium as the background, it was also revealed that the samples of Examples 1 to 7 had excellent background-hiding properties. Furthermore, the $\Delta L^*$ values of the samples of Examples 1 to 6 were within the range of 0.0 to 1.5, and thereby it was revealed that their background-hiding properties were significantly excellent.

On the other hand, the samples of Comparative Examples 1 and 2, which did not have metal layers, had $L^*$ values of 49.8 or less and thus had insufficient whiteness. Furthermore, the $\Delta L^*$ values of the samples of Comparative Examples 1 and 2 were 41.5 or more, and thereby it was revealed that their background-hiding properties were also insufficient.

Table 4 shows the results when the record media were a transparent medium "SP2 (manufactured by Kimoto Co., Ltd.)".

TABLE 4

| Record medium: SP2 | Example | | | | | | | | | | Comparative Example | |
|---|---|---|---|---|---|---|---|---|---|---|---|---|
| | 8 | | 9 | | 10 | | 11 | | 12 | | 3 | |
| Type of metallic ink composition | 2 | | 2 | | 2 | | 2 | | 2 | | — | |
| Number of metal layer | 1 | | 2 | | 1 | | 2 | | 1 | | 0 | |
| Type of white ink composition | 1 | | 1 | | 1 | | 1 | | 1 | | 1 | |
| Number of white layer | 1 | | 1 | | 1 | | 1 | | 2 + 1 | | 1 | |
| Evaluation item | OD(M) | L* | OD(M) | L* | OD(M) | L* | OD(M) | L* | OD(M) | L* | OD(M) | L* |
| L* value, base layer: white (L* = 93.6) | 1.76 | 67.1 | 1.86 | 63.3 | 1.53 | 69.6 | 1.60 | 68.8 | 1.49 | 72.4 | 1.66 | 90.4 |
| L* value, base layer: black (L* = 4.6) | 1.99 | 65.1 | 2.01 | 63.0 | 1.62 | 67.9 | 1.70 | 68.4 | 1.54 | 71.0 | 2.09 | 49.6 |
| Δ | 0.23 | 2.0 | 0.15 | 0.3 | 0.09 | 1.7 | 0.10 | 0.2 | 0.05 | 1.4 | 0.43 | 40.8 |

As shown in Table 4, it was revealed that the L* values measured by placing a black medium (L*=4.6) on the background were 63.0 or more in all samples of Examples 8 to 12 and that the samples thus had excellent whiteness. In this evaluation, since the degrees of whiteness were measured by placing the black medium as the background, it was also revealed that the samples of Examples 8 to 12 had excellent background-hiding properties. Furthermore, the ΔL* values (shown in the column of Δ of the L* in the table) of the samples of Examples 8 to 12 were within the range of 0.2 to 2.0, and thereby it was revealed that their background-hiding properties were significantly excellent. Furthermore, the ΔOD values (shown in the column of Δ of the OD(M) in the table) of the samples of Examples 8 to 12 were within the range of 0.05 to 0.23, and thereby it was revealed that the color of magenta was hardly seen and the background-hiding properties were significantly excellent.

On the other hand, the sample of Comparative Example 3, which did not have a metal layer, had an L* value of 49.6 and thus had insufficient whiteness. Furthermore, the sample of Comparative Example 3 had a ΔL* value of 40.8 and a ΔOD of 0.43, and thereby it was revealed that its background-hiding property was also insufficient.

In addition, full-color images were printed using standard yellow, magenta, cyan, and black inks with the ink-jet recording apparatus, instead of the solid images printed using magenta, and then the same printing process as that in Examples 8 to 13 was performed according to the above-described method. As a result, opaque layers that hardly allow the background being seen were formed in all cases.

Table 5 shows the results when the record media were a transparent medium "SOLN-100 (with adhesive) (transparent PET film manufactured by VIGteQnos Co., Ltd.)".

TABLE 5

| Record medium: SOLN-100 | Example | | | | Comparative Example |
|---|---|---|---|---|---|
| | 13 | 14 | 15 | 16 | 4 |
| Type of metallic ink composition | 1 | 1 | 1 | 2 | — |

TABLE 5-continued

| Record medium: SOLN-100 | Example | | | | Comparative Example |
|---|---|---|---|---|---|
| | 13 | 14 | 15 | 16 | 4 |
| Number of metal layer | 1 | 2 | 3 | — | 0 |
| Type of white ink composition | 1 | 1 | 1 | 3 | 1 |
| Number of white layer | 1 | 1 | 1 | — | 1 |
| L* value, base layer: white (L* = 93.6) | 74.7 | 79.5 | 79.3 | — | 88.7 |
| L* value, base layer: black (L* = 4.6) | 73.7 | 79.5 | 79.1 | 57.9 | 44.7 |
| ΔL* | 1.0 | 0.0 | 0.2 | — | 44.0 |

As shown in Table 5, it was revealed that the L* values measured by placing a black medium (L*=4.6) on the background were 57.9 or more in all samples of Examples 13 to 16 and that the samples thus had excellent whiteness. In this evaluation, since the degrees of whiteness were measured by placing the black medium as the background, it was also revealed that the samples of Examples 13 to 16 had excellent background-hiding properties. Furthermore, the ΔL* values of the samples of Examples 13 to 15 were within the range of 0.0 to 1.0, and thereby it was revealed that their background-hiding properties were significantly excellent.

On the other hand, the sample of Comparative Example 4, which did not have a metal layer, had an L* value of 44.7 and thus had insufficient whiteness. Furthermore, the sample of Comparative Example 4 had a ΔL* value of 44.0, and thereby it was revealed that the background-hiding property was also insufficient.

Table 6 shows the results when the record media were a black medium "ViewCal VC901 (black vinyl chloride sheet manufactured by Sakurai Co., Ltd.). Since the record medium itself was opaque, L* values may be measured using the recorded matter alone.

TABLE 6

| Record medium: VC-901 | Example | | | | | | | | | | Comparative Example | | |
|---|---|---|---|---|---|---|---|---|---|---|---|---|---|
| | 17 | 18 | 19 | 20 | 21 | 22 | 23 | 24 | 25 | 26 | 5 | 6 | 7 |
| Type of metallic ink composition | 1 | 1 | 1 | 1 | 1 | 1 | 1 | 1 | 1 | 2 | — | — | — |
| Number of metal layer | 1 | 2 | 3 | 1 | 2 | 3 | 1 | 2 | 3 | — | 0 | 0 | 0 |

TABLE 6-continued

|  | Example | | | | | | | | | | Comparative Example | | |
| --- | --- | --- | --- | --- | --- | --- | --- | --- | --- | --- | --- | --- | --- |
| Record medium: VC-901 | 17 | 18 | 19 | 20 | 21 | 22 | 23 | 24 | 25 | 26 | 5 | 6 | 7 |
| Type of white ink composition | 1 | 1 | 1 | 1 | 1 | 1 | 1 | 1 | 1 | 3 | 1 | 1 | 1 |
| Number of white layer | 1 | 1 | 1 | 2 | 2 | 2 | 3 | 3 | 3 | — | 1 | 2 | 3 |
| L* value | 80.8 | 81.2 | 79.5 | 81.6 | 82.8 | 82.6 | 82.4 | 83.4 | 83.4 | 63.0 | 58.6 | 73.9 | 79.9 |

As shown in Table 6, it was revealed that the L* values measured by placing a black medium (L*=4.6) on the background were 63.0 or more in all samples of Examples 17 to 26 and that the samples thus had excellent whiteness. In this evaluation, since the degrees of whiteness were measured by placing the black medium as the background, it was also revealed that the samples of Examples 17 to 26 had excellent background-hiding properties.

On the other hand, the sample of Comparative Example 5, which did not have a metal layer, had an L* value of 58.6 and was insufficient in the degree of whiteness and the background-hiding property compared to the samples having at least one metal layer of Examples 17 to 25 and the sample having one opaque layer of Example 26. The sample in Comparative Example 6, which did not have a metal layer and had two white layers, had an L* value of 73.9 and was insufficient in the degree of whiteness and the background-hiding property compared to the sample having one metal layer and one white layer of Example 17 and the sample having one metal layer and two white layers of Example 20. The sample in Comparative Example 7, which did not have a metal layer and had three white layers, had an L* value of 79.9 and was insufficient in the degree of whiteness and the background-hiding property compared to the sample having two metal layers and one white layer of Example 18, the sample having one metal layer and two white layers of Example 20, and the sample having one metal layer and three white layers of Example 23.

In addition, all samples of the above-described Examples were used as new record media, and full-color images were printed on the opaque layer of each of the new record media with the ink-jet printer SP-300V (manufactured by Roland DG Corp.) loaded with standard yellow, magenta, cyan, and black inks. As a result, the backgrounds were hardly seen, and thereby fine and satisfactory images could be printed.

Table 7 shows the results of Comparative Examples 8 to 13 in which transparent record media, "SP2 (transparent PET film manufactured by Kimoto Co., Ltd.)" and "SOLN-100 (with adhesive) (transparent PET film manufactured by VIGteQnos Co., Ltd.)", and a black opaque medium, "View-Cal VC901 (black vinyl chloride sheet manufactured by Sakurai Co., Ltd.), were used as the record media. The whiteness of each sample was evaluated as in above.

TABLE 7

|  |  | Comparative Example | | | | | |
| --- | --- | --- | --- | --- | --- | --- | --- |
| Record medium |  | 8 | 9 | 10 | 11 | 12 | 13 |
| L* value | SP2 | 40.3 | 49.2 | 43.2 | 50 | 42.9 | 50.9 |
|  | SOLN-100 | 41.1 | 50.1 | 41.6 | 50.2 | 45.4 | 52.2 |
|  | VC901 | 44 | 56.2 | 42.3 | 55.4 | 50.6 | 59.5 |

As shown in Table 7, the L* values of the samples of Comparative Examples 8 to 13 in which the white ink composition 3 and the metallic ink composition 2 were simultaneously discharged on a record medium were lower than the L* values of the samples of Examples 7, 16, and 26 in which the opaque ink composition consisting of the same amounts of the white ink composition 3 and the metallic ink composition 2 was used. This means that excellent whiteness can be given by using an opaque ink composition composed of the metallic ink composition and the white ink composition that are mixed in advance before printing, even if the mixture ratio of the white ink composition and the metallic ink composition is changed or the printing is repeated.

The above-described results reveal that the sample of each Example was provided with an opaque layer hardly allowing the background being seen and having satisfactory whiteness.

The invention is not limited to the above-described Embodiments, and various modifications are applicable. For example, the invention includes substantially the same configurations as those described in Embodiments (for example, configurations having the same functions, processes, and results, or configurations having the same purposes and effects). Furthermore, the invention includes configurations in which portions not being essential of the configurations described in Embodiments are substituted. Furthermore, the invention includes configurations that can achieve the same effects or purposes as those of the configurations described in Embodiments. Furthermore, the invention includes configurations in which publicly known technology is added to the configurations described in Embodiments.

What is claimed is:

1. A method of forming a composite layer comprising:
   forming a first layer by discharging droplets of an ink composition containing a single pigment consisting of aluminum or aluminum alloy to a record medium by an ink-jet recording process;
   forming a second layer by discharging droplets of an ink composition containing a single pigment consisting of white metal oxide particles to the record medium by an ink-jet recording process;
   recording an image to the composite layer by an ink-jet recording process; and
   heating the record medium during at least forming the first layer and forming the second layer;
   wherein an average particle diameter of the metal oxide particles is 0.05 to 0.8 µm;
   the aluminum or aluminum alloy pigment comprises plate-like particles, wherein when a major axis and a minor axis of flat surfaces of the plate-like particles are defined as X and Y respectively and a thickness of the particles is defined as Z, then a 50% average particle diameter of R50 based on circle-equivalent diameters determined form an X-Y plane area of the plate-like particles satisfies a condition: R50/Z>5, and R50 is in the range of 0.5 to 3 µm; and
   a thickness of the first layer is 0.01 to 10 µm, and a thickness of the second layer is 0.1 to 10 µm; and
   wherein an absolute value of difference (ΔL*) is not more than 1.5 according to the following expression:

ΔL*=(L1*value of a sample placed on a white medium (L*=93.6))−(L2*value of a sample placed on a black medium (L*=4.6)); and wherein the sample(s) are formed by forming the first layer on the second layer on a surface of the record medium; and wherein the second layer L2* value is not more than 49.8.

2. The method of forming a composite layer according to claim 1, wherein the first layer is closer to the record medium than the second layer is.

3. The method of forming a composite layer according to claim 2, further comprising:

forming a third layer with an ink composition containing a metallic pigment on the second layer such that the second layer is between the third layer and the record medium.

4. The method of forming a composite layer according to claim 3, further comprising:

forming a fourth layer with an ink composition containing a white pigment on the first layer such that the first layer is between the fourth layer and the record medium.

5. The method of forming an a composite according to claim 1, wherein the second layer is closer to the record medium than the first layer is.

6. The method of forming a composite layer according to claim 1, wherein the record medium is one selected from the group consisting of colorless transparent, translucent, colored transparent, colored translucent, chromatic opaque, and achromatic opaque objects.

7. The method of forming a composite layer according to claim 1, wherein the record medium has an image formed thereon.

8. The method of forming a composite layer according to claim 1, wherein the opaque layer has an L* value of 55 or higher.

9. The method of forming a composite layer according to claim 1, wherein a thickness of the composite layer is at least 0.5 μm.

10. A recording process comprising carrying out the method of forming a composite layer according to claim 1, and forming an image on the composite layer.

* * * * *